(12) United States Patent
Suzuki et al.

(10) Patent No.: US 8,473,182 B2
(45) Date of Patent: Jun. 25, 2013

(54) INTERNAL COMBUSTION ENGINE CONTROL DEVICE

(75) Inventors: Kunihiko Suzuki, Hitachinaka (JP); Seiji Asano, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/511,384

(22) PCT Filed: Dec. 9, 2010

(86) PCT No.: PCT/JP2010/072139
§ 371 (c)(1),
(2), (4) Date: May 23, 2012

(87) PCT Pub. No.: WO2011/074475
PCT Pub. Date: Jun. 23, 2011

(65) Prior Publication Data
US 2012/0290193 A1  Nov. 15, 2012

(30) Foreign Application Priority Data

Dec. 15, 2009  (JP) .................................. 2009-284342

(51) Int. Cl.
| | |
|---|---|
| G06F 19/00 | (2006.01) |
| F02B 33/44 | (2006.01) |
| F02P 5/15 | (2006.01) |
| F02D 41/14 | (2006.01) |
| G01L 15/00 | (2006.01) |

(52) U.S. Cl.
USPC ...... 701/103; 123/348; 123/403; 123/406.29; 123/406.44; 123/406.5; 701/109; 701/110; 60/600; 702/182; 73/114.34

(58) Field of Classification Search
USPC .................. 123/90.15–90.18, 347, 348, 361, 123/399, 403, 406.26, 406.29, 406.44, 406.45, 123/406.46, 406.5, 406.51; 701/102, 103, 701/109, 110, 115; 60/600, 601; 702/182, 702/187, 189; 73/114.34, 114.37
See application file for complete search history.

(56) References Cited

U.S. PATENT DOCUMENTS 5,992,389 A    11/1999  Ohsaki
6,035,639 A *  3/2000  Kolmanovsky et al. ..... 60/605.2
(Continued)

FOREIGN PATENT DOCUMENTS

| JP | 6-33819 A | 2/1994 |
|---|---|---|
| JP | 7-180643 A | 7/1995 |

(Continued)

OTHER PUBLICATIONS

International Search Report dated Jan. 18, 2011 (two (2) pages).

(Continued)

*Primary Examiner* — Willis R Wolfe, Jr.
(74) *Attorney, Agent, or Firm* — Crowell & Moring LLP

(57) ABSTRACT

An internal combustion engine control device is provided which can accurately estimate intake pipe temperature behavior during transient time even in an internal combustion engine embedded with a variable valve or a turbocharger. The internal combustion engine control device estimates transient behavior of the intake pipe temperature, on the basis of a flow rate (dGafs/dt) of gas flowing into the intake pipe, a flow rate (dGcyl/dt) of gas flowing from the intake pipe, an intake pipe pressure Pin, and a temporal changing rate (dPin/dt) of the intake pipe pressure. The device performs knocking control during transient time, on the basis of the estimated transient behavior of the intake pipe temperature.

29 Claims, 21 Drawing Sheets

U.S. PATENT DOCUMENTS

| | | | |
|---|---|---|---|
| 6,095,127 A * | 8/2000 | Kolmanovsky et al. | 123/676 |
| 6,651,610 B2 * | 11/2003 | Nishimura et al. | 123/295 |
| 7,159,453 B2 * | 1/2007 | Muto et al. | 73/114.34 |
| 2002/0124828 A1 | 9/2002 | Shirakawa | |

FOREIGN PATENT DOCUMENTS

| | | | |
|---|---|---|---|
| JP | 10-299542 A | 11/1998 | |
| JP | 2002-276444 A | 9/2002 | |
| JP | 2005-337225 | 12/2005 | |
| JP | 2005-337225 A | 12/2005 | |
| JP | 2008157147 A * | 7/2008 | 701/103 |

OTHER PUBLICATIONS

Form PCT/ISA/237 (three (3) pages), May 23, 2012.
Japanese Office Action, Aug. 17, 2012 with English translation of Office Action of Japanese Patent Application No. 2009-284342 (5 pages).

* cited by examiner

Fig. 4
(a)
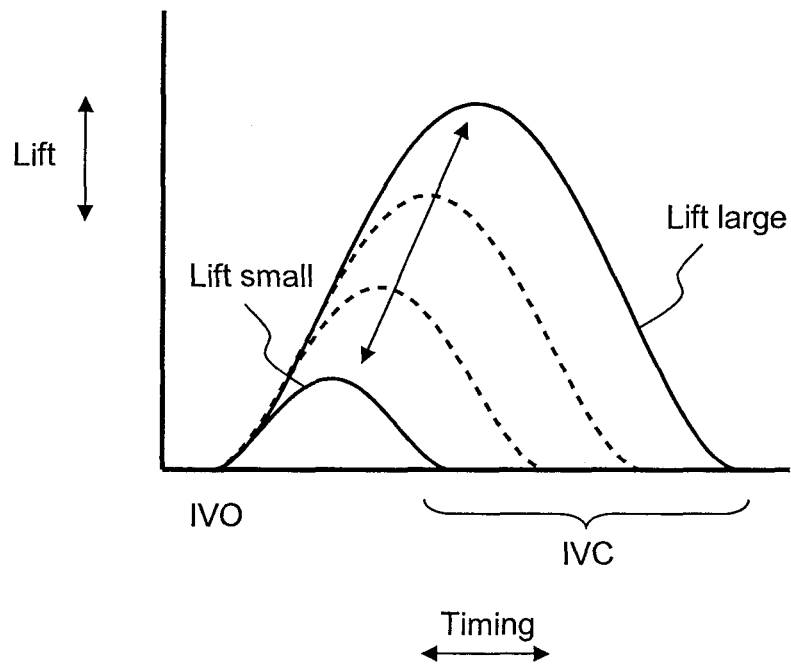
(b)
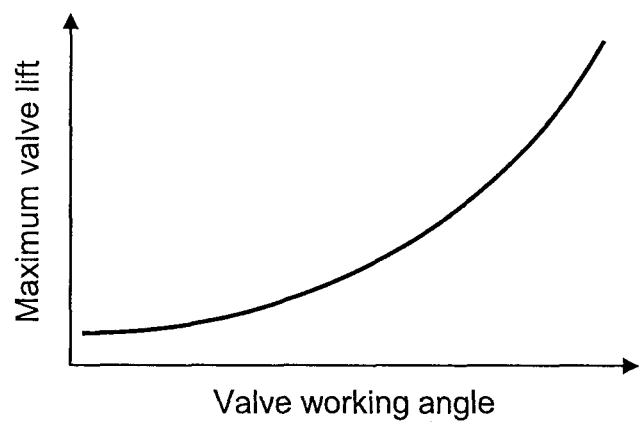

$p$ : Pressure
$T$ : Temperature
$V$ : Volume
$\dfrac{dG}{dt}$ : Mass flow rate

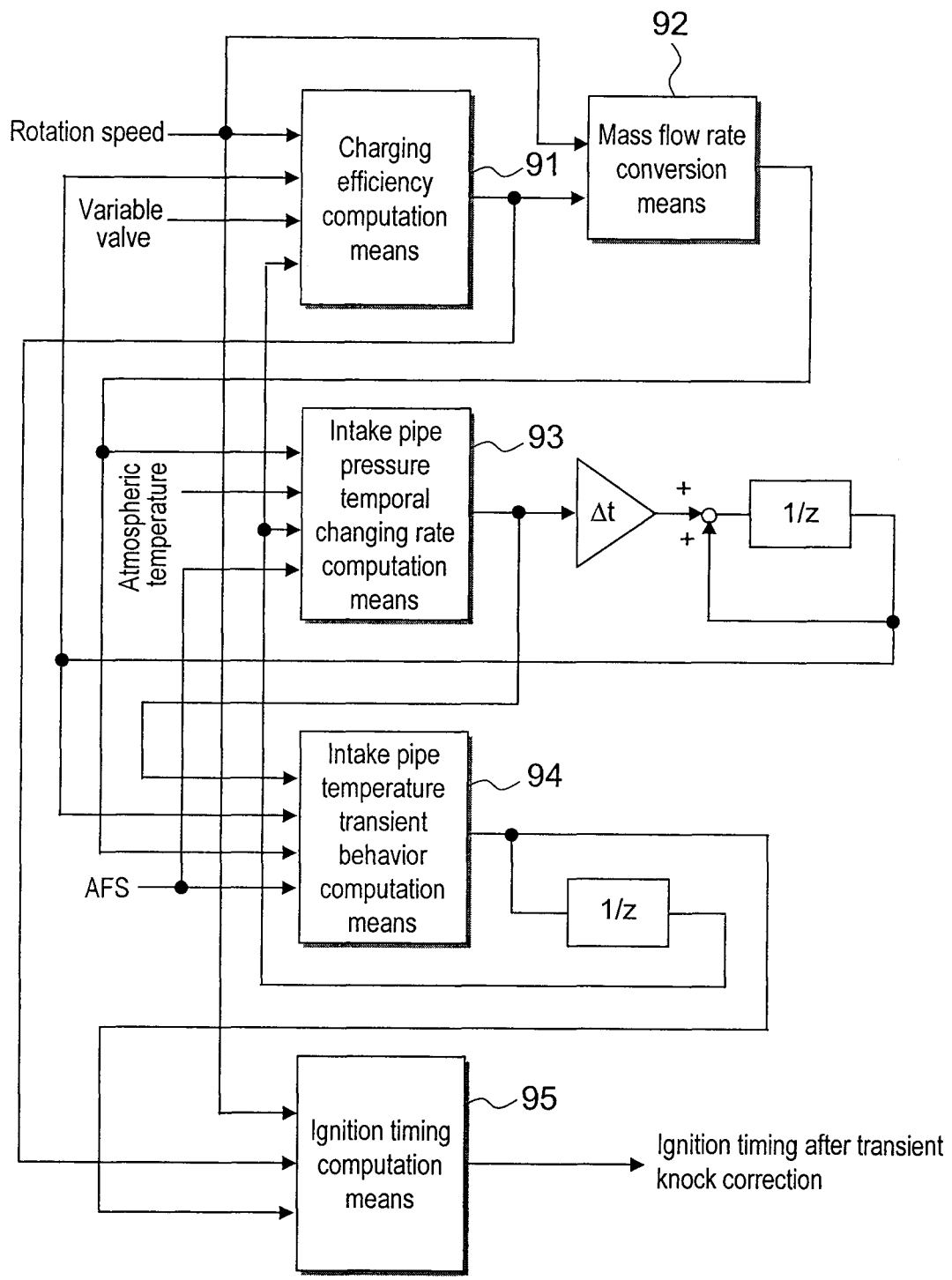

104:
- $A_{36} x_4$
- $A_{37} x_4^2$
- $A_{38} x_4^3$
- $A_{39} x_4^4$
- $A_{40} x_4 x_1$
- $A_{41} x_4 x_2$
- $A_{42} x_4 x_3$
- $A_{43} x_4 x_1^2$
- $A_{44} x_4 x_2^2$
- $A_{45} x_4 x_3^2$
- $A_{46} x_4^2 x_1$
- $A_{47} x_4^2 x_2$
- $A_{48} x_4^2 x_3$
- $A_{49} x_4^2 x_1^2$
- $A_{50} x_4^2 x_2^2$
- $A_{51} x_4^2 x_3^2$
- $A_{52} x_4 x_1^3$
- $A_{53} x_4 x_2^3$
- $A_{54} x_4 x_3^3$
- $A_{55} x_4^3 x_1$
- $A_{56} x_4^3 x_2$
- $A_{57} x_4^3 x_3$
- $A_{58} x_4 x_1 x_2$
- $A_{59} x_4 x_1 x_3$
- $A_{60} x_4 x_2 x_3$
- $A_{61} x_4 x_1^2 x_2$
- $A_{62} x_4 x_1^2 x_3$
- $A_{63} x_4 x_2^2 x_3$
- $A_{64} x_4 x_1 x_2^2$
- $A_{65} x_4 x_1 x_3^2$
- $A_{66} x_4 x_2 x_3^2$
- $A_{67} x_4^2 x_1 x_2$
- $A_{68} x_4^2 x_1 x_3$
- $A_{69} x_4^2 x_2 x_3$
- $A_{70} x_4 x_1 x_2 x_3$ $y$: Charging efficiency
$A$: Partial regression coefficient
$x_1$: Rotation speed
$x_2$: Intake pipe pressure
$x_3$: IVO
$x_4$: EVC Fig. 11
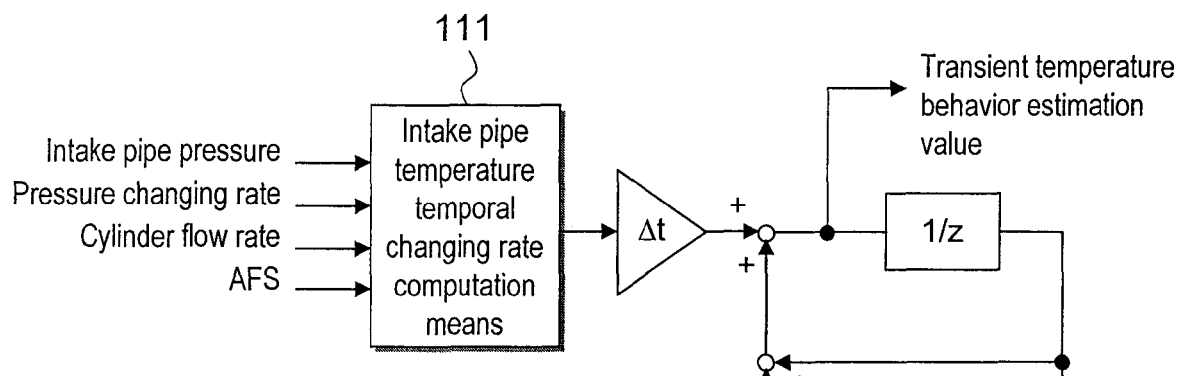
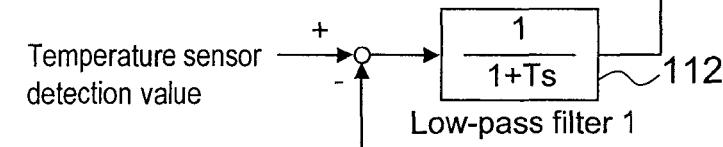
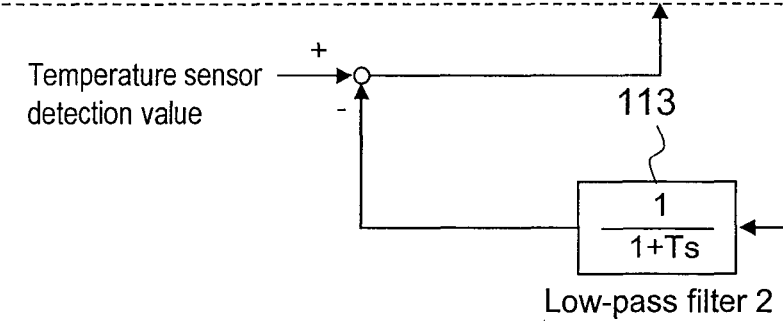

Fig. 13
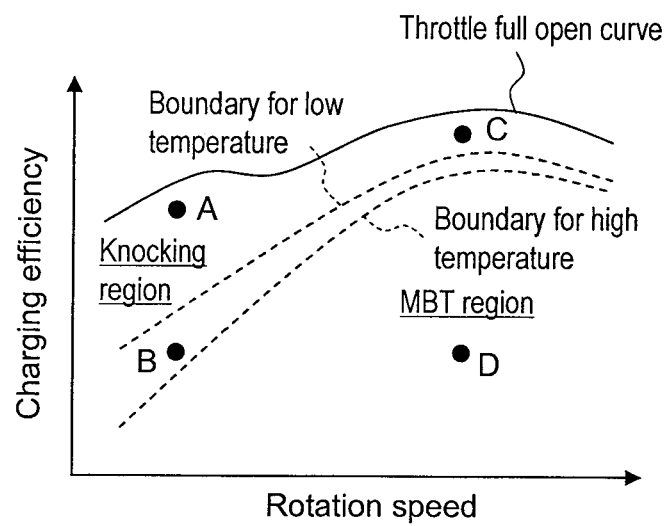
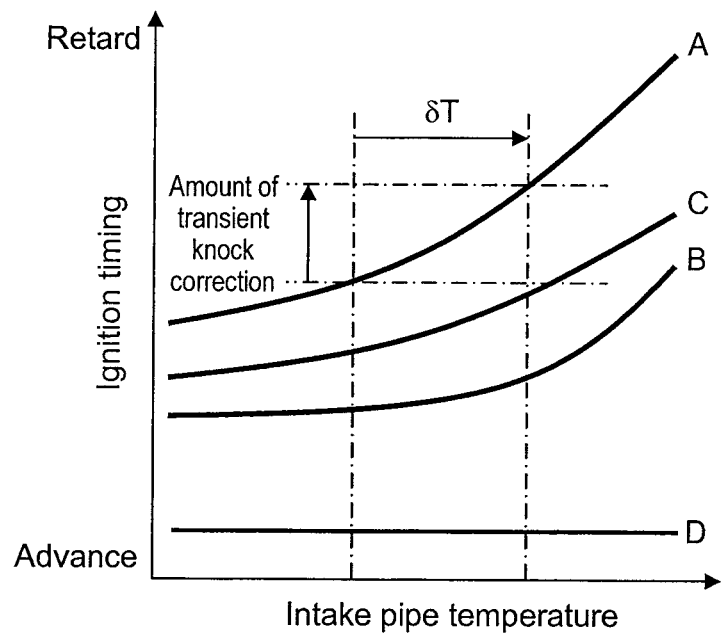

143:
- $A_{16}\, x_3$
- $A_{17}\, x_3^2$
- $A_{18}\, x_3^3$
- $A_{19}\, x_3^4$
- $A_{20}\, x_3 x_1$
- $A_{21}\, x_3 x_2$
- $A_{22}\, x_3 x_1^2$
- $A_{23}\, x_3 x_2^2$
- $A_{24}\, x_3^2 x_1$
- $A_{25}\, x_3^2 x_2$
- $A_{26}\, x_3^2 x_1^2$
- $A_{27}\, x_3^2 x_2^2$
- $A_{28}\, x_3 x_1^3$
- $A_{29}\, x_3 x_2^3$
- $A_{30}\, x_3^3 x_1$
- $A_{31}\, x_3^3 x_2$
- $A_{32}\, x_3 x_1 x_2$
- $A_{33}\, x_3 x_1^2 x_2$
- $A_{34}\, x_3 x_1 x_2^2$
- $A_{35}\, x_3^2 x_1 x_2$ $y$: Ignition timing
$A$: Partial regression coefficient
$x_1$: Rotation speed
$x_2$: Charging efficiency
$x_3$: Intake pipe temperature Fig. 15
(a)
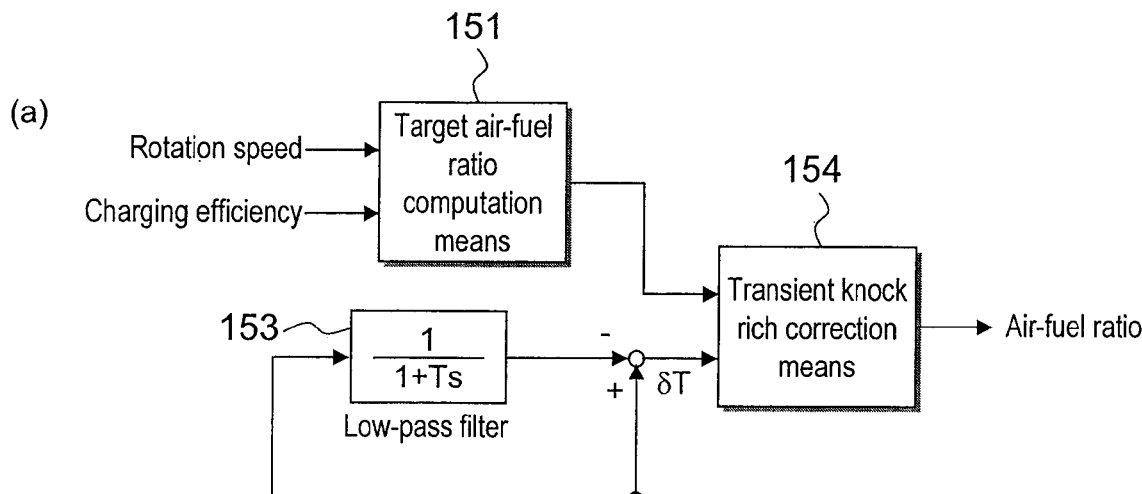
(b)
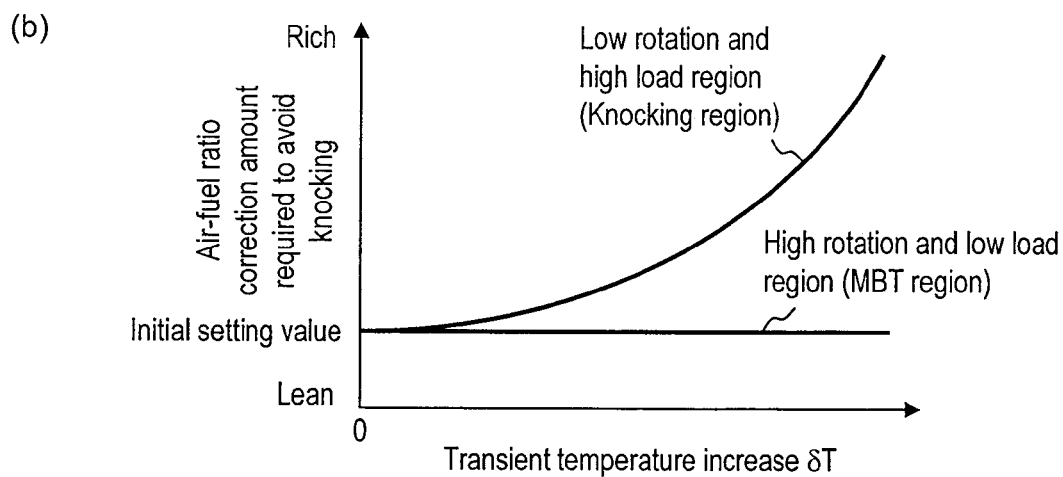

Fig. 21

| | | | |
|---|---|---|---|
| $A_1$ | $A_{36}\ x_4$ | $A_{71}\ x_5$ | $A_{106}\ x_5 x_1^2 x_3$ |
| $A_2\ x_1$ | $A_{37}\ x_4^2$ | $A_{72}\ x_5^2$ | $A_{107}\ x_5 x_1^2 x_4$ |
| $A_3\ x_1^2$ | $A_{38}\ x_4^3$ | $A_{73}\ x_5^3$ | $A_{108}\ x_5 x_2^2 x_3$ |
| $A_4\ x_1^3$ | $A_{39}\ x_4^4$ | $A_{74}\ x_5^4$ | $A_{109}\ x_5 x_2^2 x_4$ |
| $A_5\ x_1^4$ | $A_{40}\ x_4 x_1$ | $A_{75}\ x_5 x_1$ | $A_{110}\ x_5 x_3^2 x_4$ |
| $A_6\ x_2$ | $A_{41}\ x_4 x_2$ | $A_{76}\ x_5 x_2$ | $A_{111}\ x_5 x_1 x_2^2$ |
| $A_7\ x_2^2$ | $A_{42}\ x_4 x_3$ | $A_{77}\ x_5 x_3$ | $A_{112}\ x_5 x_1 x_3^2$ |
| $A_8\ x_2^3$ | $A_{43}\ x_4 x_1^2$ | $A_{78}\ x_5 x_4$ | $A_{113}\ x_5 x_1 x_4^2$ |
| $A_9\ x_2^4$ | $A_{44}\ x_4 x_2^2$ | $A_{79}\ x_5 x_1^2$ | $A_{114}\ x_5 x_2 x_3^2$ |
| $A_{10}\ x_2 x_1$ | $A_{45}\ x_4 x_3^2$ | $A_{80}\ x_5 x_2^2$ | $A_{115}\ x_5 x_2 x_4^2$ |
| $A_{11}\ x_2 x_1^2$ | $A_{46}\ x_4^2 x_1$ | $A_{81}\ x_5 x_3^2$ | $A_{116}\ x_5 x_3 x_4^2$ |
| $A_{12}\ x_2^2 x_1$ | $A_{47}\ x_4^2 x_2$ | $A_{82}\ x_5 x_4^2$ | $A_{117}\ x_5^2 x_1 x_2$ |
| $A_{13}\ x_2^2 x_1^2$ | $A_{48}\ x_4^2 x_3$ | $A_{83}\ x_5^2 x_1$ | $A_{118}\ x_5^2 x_1 x_3$ |
| $A_{14}\ x_2 x_1^3$ | $A_{49}\ x_4^2 x_1^2$ | $A_{84}\ x_5^2 x_2$ | $A_{119}\ x_5^2 x_1 x_4$ |
| $A_{15}\ x_2^3 x_1$ | $A_{50}\ x_4^2 x_2^2$ | $A_{85}\ x_5^2 x_3$ | $A_{120}\ x_5^2 x_2 x_3$ |
| $A_{16}\ x_3$ | $A_{51}\ x_4^2 x_3^2$ | $A_{86}\ x_5^2 x_4$ | $A_{121}\ x_5^2 x_2 x_4$ |
| $A_{17}\ x_3^2$ | $A_{52}\ x_4 x_1^3$ | $A_{87}\ x_5^2 x_1^2$ | $A_{122}\ x_5^2 x_3 x_4$ |
| $A_{18}\ x_3^3$ | $A_{53}\ x_4 x_2^3$ | $A_{88}\ x_5^2 x_2^2$ | $A_{123}\ x_5 x_1 x_2 x_3$ |
| $A_{19}\ x_3^4$ | $A_{54}\ x_4 x_3^3$ | $A_{89}\ x_5^2 x_3^2$ | $A_{124}\ x_5 x_2 x_3 x_4$ |
| $A_{20}\ x_3 x_1$ | $A_{55}\ x_4^3 x_1$ | $A_{90}\ x_5^2 x_4^2$ | $A_{125}\ x_5 x_3 x_4 x_1$ |
| $A_{21}\ x_3 x_2$ | $A_{56}\ x_4^3 x_2$ | $A_{91}\ x_5 x_1^3$ | $A_{126}\ x_5 x_4 x_1 x_2$ |
| $A_{22}\ x_3 x_1^2$ | $A_{57}\ x_4^3 x_3$ | $A_{92}\ x_5 x_2^3$ | |
| $A_{23}\ x_3 x_2^2$ | $A_{58}\ x_4 x_1 x_2$ | $A_{93}\ x_5 x_3^3$ | |
| $A_{24}\ x_3^2 x_1$ | $A_{59}\ x_4 x_1 x_3$ | $A_{94}\ x_5 x_4^3$ | |
| $A_{25}\ x_3^2 x_2$ | $A_{60}\ x_4 x_2 x_3$ | $A_{95}\ x_5^3 x_1$ | |
| $A_{26}\ x_3^2 x_1^2$ | $A_{61}\ x_4 x_1^2 x_2$ | $A_{96}\ x_5^3 x_2$ | |
| $A_{27}\ x_3^2 x_2^2$ | $A_{62}\ x_4 x_1^2 x_3$ | $A_{97}\ x_5^3 x_3$ | |
| $A_{28}\ x_3 x_1^3$ | $A_{63}\ x_4 x_2^2 x_3$ | $A_{98}\ x_5^3 x_4$ | |
| $A_{29}\ x_3 x_2^3$ | $A_{64}\ x_4 x_1 x_2^2$ | $A_{99}\ x_5 x_1 x_2$ | |
| $A_{30}\ x_3^3 x_1$ | $A_{65}\ x_4 x_1 x_3^2$ | $A_{100}\ x_5 x_1 x_3$ | |
| $A_{31}\ x_3^3 x_2$ | $A_{66}\ x_4 x_2 x_3^2$ | $A_{101}\ x_5 x_1 x_4$ | |
| $A_{32}\ x_3 x_1 x_2$ | $A_{67}\ x_4^2 x_1 x_2$ | $A_{102}\ x_5 x_2 x_3$ | |
| $A_{33}\ x_3 x_1^2 x_2$ | $A_{68}\ x_4^2 x_1 x_3$ | $A_{103}\ x_5 x_2 x_4$ | |
| $A_{34}\ x_3 x_1 x_2^2$ | $A_{69}\ x_4^2 x_2 x_3$ | $A_{104}\ x_5 x_3 x_4$ | |
| $A_{35}\ x_3^2 x_1 x_2$ | $A_{70}\ x_4 x_1 x_2 x_3$ | $A_{105}\ x_5 x_1^2 x_2$ | |

$y$: Charging efficiency
$A$: Partial regression coefficient $x_1$: Rotation speed
$x_2$: Intake pipe pressure
$x_3$: IVO
$x_4$: EVC
$x_5$: Intake air temperature

INTERNAL COMBUSTION ENGINE CONTROL DEVICE

TECHNICAL FIELD

The present invention relates to a control device that controls an internal combustion engine on the basis of behavior of transient intake air temperature.

BACKGROUND ART

Internal combustion engines for automobiles in recent years tend to include variable valve mechanisms capable of changing valve timing or valve lift amounts at intake valves or exhaust valves. The variable valve mechanism has improved in technology in terms of increasing the degree of control freedom, enlarging the operational range, and improving response. More specifically, variable valve mechanisms capable of continuously and variably controlling the valve lift amount have been developed. The amount of air taken into cylinders by the lift continuous variable valve mechanism is controlled by intake valves instead of a throttle valve. This control realizes reduction in pump loss and a Miller cycle, and improves fuel consumption of an internal combustion engine. Turbo-downsizing internal combustion engines that improve the fuel consumption by mounting a turbocharger, and improve the mean effective pressure by reducing the cylinder capacity have been developed.

A control device of an internal combustion engine mounted with such a variable valve mechanism or a turbocharger detects or estimates an amount of intake air flowing through an intake pipe using an air flow sensor or a pressure sensor provided at the intake pipe. A charging efficiency is calculated from the value. An amount of ignition control is calculated on the basis of the charging efficiency and a rotation speed.

Patent Document 1 discloses a technique of correcting the ignition timing retard for preventing a transient knock during acceleration in consideration of an operational state of an engine. In the technique disclosed in Patent Document 1, an intake air temperature level of the engine before acceleration is estimated on the basis of determination criteria, such as whether the state is idle or not and whether the water temperature level is in a warm-up state or not, and changes the transient retard correction amount in response to the estimated temperature level. Further in the technique, the transient retard correction amount at a low vehicle velocity or a low rotation speed is increased, thereby preventing transient knock that tends to occur at a low velocity.

Patent Document 2 discloses a technique of controlling an internal combustion engine mounted with a turbocharger that estimates the intake air temperature during operation moment by moment and controls the ignition timing and air-fuel ratio in response to the estimated intake air temperature. The technique disclosed in Patent Document 2 includes computation means for acquiring the intake air efficiency coefficient and temperature correction coefficient specific to an engine and uniquely determining the intake air temperature by means of a linear function having parameters of the coefficients specific to the engine and a ratio of a mass of air per unit cycle to an intake pipe pressure. The ignition timing is corrected to retard side and the air-fuel ratio is corrected to the rich side, with increase in intake air temperature estimated by the computation means.

Patent Document 1: JP Patent Publication (Kokai) No. 7-180643 A (1995)

Patent Document 2: JP Patent Publication (Kokai) No. 6-33819 A (1994)

DISCLOSURE OF THE INVENTION

Problems to be Solved by the Invention

Unfortunately, in the internal combustion engine including many actuators such as the variable valves and the turbocharger, the variable valves and turbocharger operate with lag during transient time, causing innumerable acceleration patterns. Accordingly, a method of empirically determining the correction amount for appropriately preventing a transient knock in response to the warm-up state before acceleration and the vehicle velocity, significantly increases actual machine application man-hours for the internal combustion engine including many actuators, and in turn causes problems in development man-hours and cost.

The flow in an intake pipe constitutes an open system accompanied by inflow and outflow of mass and energy by transport due to working fluid. Accordingly, the intake pipe temperature cannot uniquely be estimated from the relationship of an equation of state using pressure and mass, during transient time accompanied by temporal variation in mass and energy of gas in the intake pipe. This causes a large deviation of the estimated intake pipe temperature from an actual value during transient time. As a result, there is a problem in that a transient knock cannot appropriately be adjusted.

The present invention was made in order to solve the above problems, and has an object to provide an internal combustion engine control device that can accurately estimate behavior of intake pipe temperature during transient time even in an internal combustion engine including variable valves or a turbocharger.

Means for Solving the Problems

An internal combustion engine control device of the present invention for solving the problems includes intake pipe temperature transient behavior computation means for estimating the transient behavior of the intake pipe temperature on the basis of a flow rate of gas flowing into an intake pipe, a flow rate of gas flowing from the intake pipe, an intake pipe pressure, and a temporal changing rate of the intake pipe pressure.

Advantages of the Invention

According to the present invention, the transient behavior of the intake pipe temperature on the basis of the flow rate of gas flowing into the intake pipe, the flow rate of gas flowing from the intake pipe, the intake pipe pressure, and the temporal changing rate of the intake pipe pressure can be estimated. Accordingly, transient knocking can appropriately be prevented by, for instance, computing ignition timing during transient time of the internal combustion engine on the basis of the estimated transient behavior of the intake pipe. Furthermore, even in the case where various acceleration patterns are provided, the transient temperature behavior can be computed on-board by ECU. Accordingly, the amount of transient knock correction is not necessarily applied to an actual machine on every acceleration pattern, thereby allowing actual machine application man-hours to be reduced.

This specification incorporates the contents of the specification and/or the drawings of Japanese Patent Application No. 2009-284342 on the basis of which the priority right of this application is claimed.

BRIEF DESCRIPTION OF THE DRAWINGS

FIG. 4 is a diagram illustrating a valve lift pattern of a variable valve mechanism capable of simultaneously changing the working angle, lift and phase of the valve.

FIG. 9 is a diagram illustrating a detailed configuration of the control block diagram shown in FIG. 8.

FIG. 10 is a diagram illustrating a polynomial configuring charging efficiency computation means shown in FIG. 9.

FIG. 11 is a diagram illustrating a configuration of a temperature sensor stationary correction unit for correcting an intake pipe transient temperature behavior estimation value using a temperature sensor detection value.

FIG. 13 is a diagram illustrating a relationship between the intake pipe temperature and ignition timing under conditions of different rotation speed and charging efficiency.

FIG. 14 is a diagram illustrating a polynomial configuring reference state ignition timing model computation means in FIG. 12 and present ignition timing model computation means.

FIG. 15 is an explanatory illustration of a control block diagram for air-fuel ratio rich correction control based on transient behavior of the intake pipe temperature.

FIG. 21 is a diagram illustrating a polynomial configuring charging efficiency computation means shown in FIG. 20.

DESCRIPTION OF SYMBOLS

Figure 1:
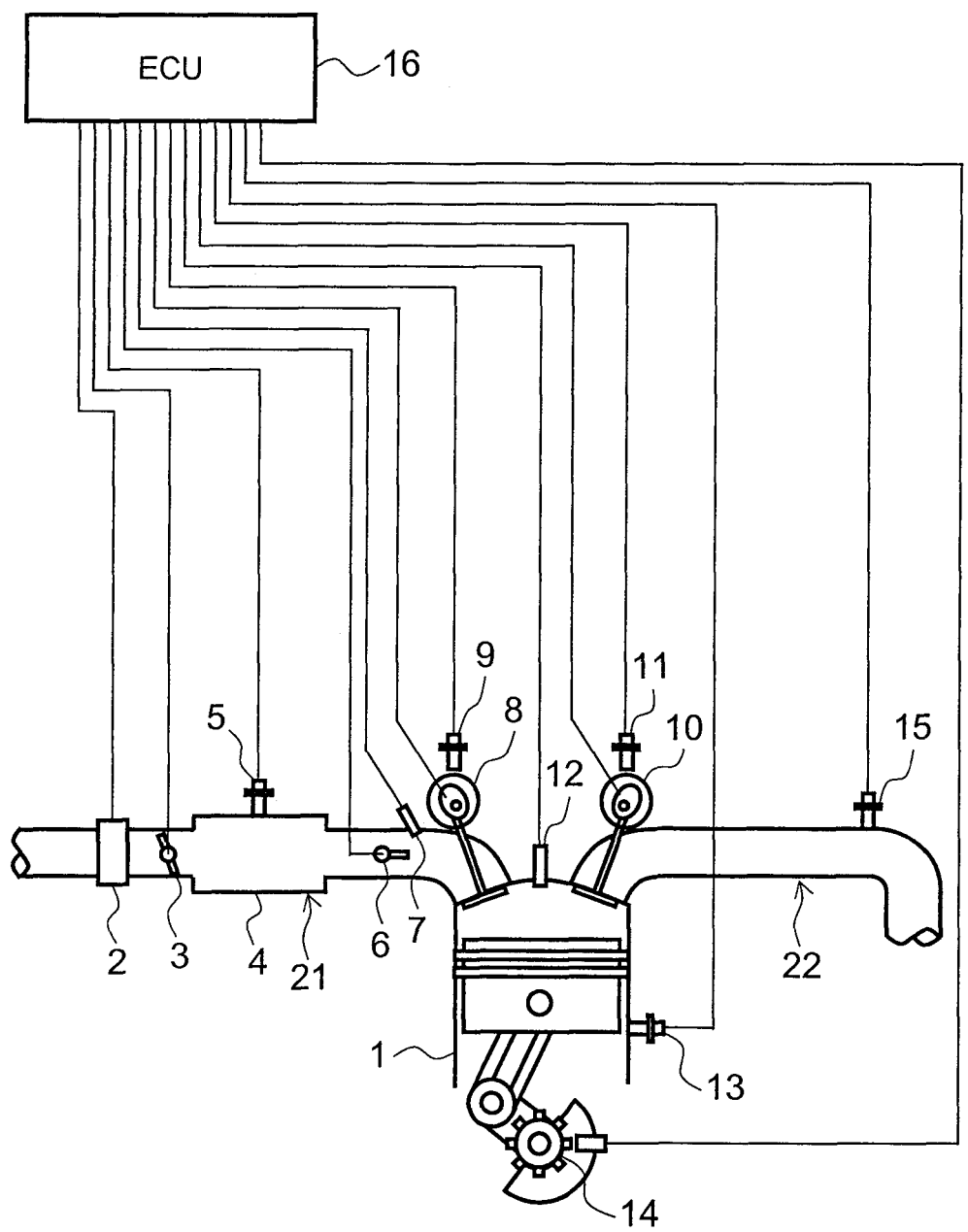
FIG. 1 is a diagram illustrating a configuration of a system according to a first embodiment.

1 Internal combustion engine
2 Airflow sensor and intake air temperature sensor
3 Throttle valve
4 Intake manifold
5 Intake pipe pressure sensor
6 Tumble control valve
7 Fuel injection valve
8 Intake variable valve mechanism
9 Valve lift sensor and valve timing sensor
10 Exhaust variable valve mechanism
11 Valve timing sensor
12 Ignition plug
13 Knock sensor
14 Crank angle sensor
15 Air-fuel ratio sensor
16 ECU (electronic control unit)
17 Turbocharger
18 Air bypass valve
19 Waste gate valve
20 Intercooler
21 Intake flow path
22 Exhaust flow path
23 Charged temperature sensor

BEST MODE FOR CARRYING OUT THE INVENTION

First Embodiment

A first embodiment of the present invention will hereinafter be described with reference to the drawings.

FIG. 1 is a diagram illustrating a configuration of a system in this embodiment. As shown in FIG. 1, the system in this embodiment includes an internal combustion engine 1. An intake flow path 21 and an exhaust flow path 22 communicate with the internal combustion engine 1. An airflow sensor 2 including an intake pipe temperature sensor is fixed to the intake flow path 21. A throttle valve 3 is provided downstream of the airflow sensor 2. The throttle valve 3 may be an electronically controlled throttle valve capable of controlling throttle opening independently from the amount of stepping the accelerator.

An intake manifold 4 configuring a part of the intake pipe is installed downstream of the throttle valve 3. An intake pipe pressure sensor 5 is mounted on the intake manifold 4. A tumble control valve for intensifying turbulence in a cylinder by causing a drift in the intake air, and a fuel injection valve 7 for injecting fuel into an intake air port are arranged downstream of the intake manifold 4.

The internal combustion engine 1 includes an intake valve 8 provided with a variable valve mechanism capable of continuously changing valve opening and closing timing and a valve operation amount including an amount of lift. An intake valve sensor 9 for detecting the valve timing and maximum lift is installed on the variable valve mechanism.

The internal combustion engine 1 further includes an exhaust valve 10. The exhaust valve 10 includes a variable valve mechanism capable of changing exhaust valve timing (valve operation amount) which causes an exhaust valve sensor 11 to detect exhaust valve timing of the exhaust valve 10.

An ignition plug 12 exposing its electrode in a cylinder is installed on a cylinder head. Furthermore, a knock sensor 13 for detecting occurrence of knocking is installed on the cylinder. A crank angle sensor 14 is installed on a crankshaft, thereby allowing detection of a rotation speed of the internal combustion engine 1 on the basis of an output signal from the crank angle sensor 14. An air-fuel ratio sensor 15 is installed in the exhaust flow path 22. Feedback control is performed such that an amount of injected fuel supplied from the fuel injection valve 7 realizes a target air-fuel ratio, on the basis of a detection result of the air-fuel ratio sensor 15.

As shown in FIG. 1, the system of this embodiment includes an ECU (electronic control unit) 16. The ECU 16 is connected with the aforementioned various sensors. Actuators such as the throttle valve 3, the fuel injection valve 7, the intake valve 8 having the variable valve mechanism, the exhaust valve 10 having the variable valve mechanism are controlled by the ECU 16. The operational state of the internal combustion engine 1 is detected on the basis of signals input from the aforementioned various sensors, and the ignition plug 12 causes ignition at timing determined by the ECU 16 in response to the operational state.

Figure 2:
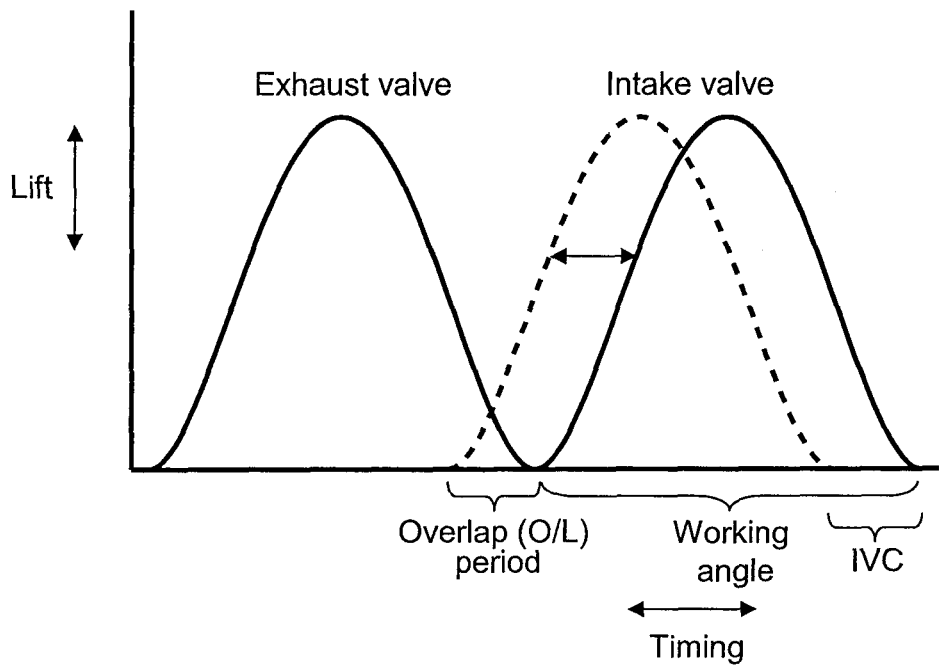
FIG. 2 is a diagram illustrating change of an overlap period between an intake valve and an exhaust valve and change of an intake valve close period (IVC: intake valve close) in the case of continuously changing the phase of the intake valve.

FIG. 2 is a diagram illustrating change of an overlap period between an intake valve and an exhaust valve and change of an intake valve close period (IVC: intake valve close) in the case of continuously changing the phase of the intake valve. As the phase of the intake valve 8 is changed to the advance side, the overlap period with the exhaust valve 10 increases. In the internal combustion engine including the variable valve, under a partial load condition, the variable valve is controlled so as to cause the overlap period, and internal EGR is caused by temporarily blowing back the exhaust gas in the exhaust pipe into the intake pipe. Increase in the internal EGR can reduce pump loss under the partial load condition, and reduce combustion gas temperature, thereby allowing nitrogen oxides in the exhaust to be reduced.

Figure 3:
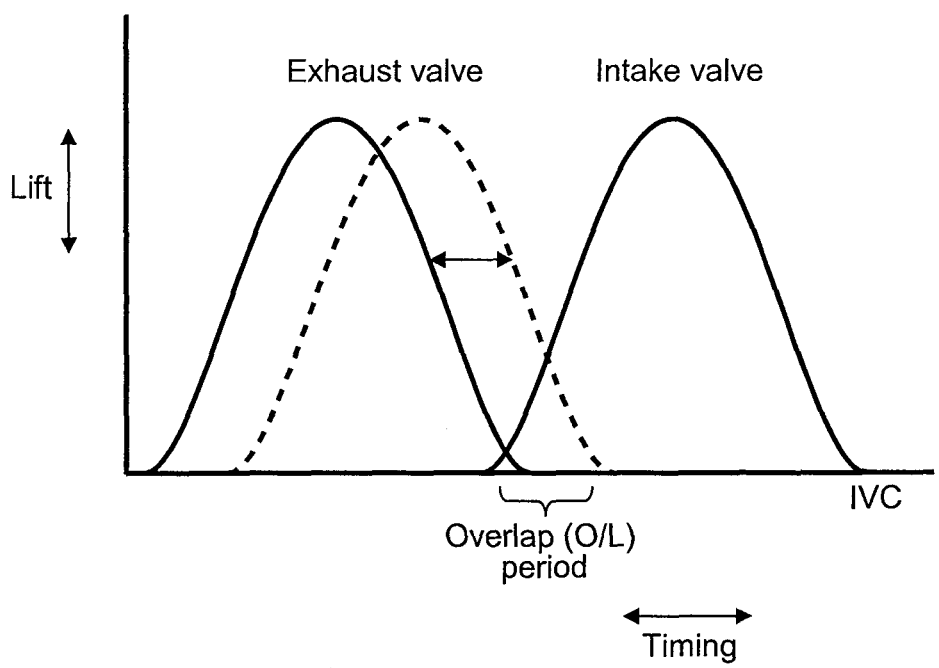
FIG. 3 is a diagram illustrating change of the overlap period between the intake valve and the exhaust valve in the case of continuously changing the phase of the exhaust valve.

FIG. 3 is a diagram illustrating change of the overlap period between the intake valve and the exhaust valve in the case of continuously changing the phase of the exhaust valve. As the phase of the exhaust valve 10 is changed to the retard side, the overlap period with the intake valve 8 is increased. Also in the internal combustion engine having a variable valve capable of changing the exhaust phase, the internal EGR can be increased to reduce the pump loss and nitrogen oxides under the partial load condition, as described above.

FIG. 4 is a diagram illustrating a valve lift pattern of a variable valve mechanism capable of simultaneously changing the working angle, lift and phase of the valve. In a conventional internal combustion engine controlling charging efficiency mainly by means of a throttle valve, a negative pressure is caused by suppressing a pressure upstream of an intake valve by means of the throttle valve. This causes a problem of decreasing fuel consumption owing to pump loss. If timing of opening and closing the intake valve can control the intake air amount without suppressing the pressure upstream of the intake valve, the pump loss can be reduced and decrease in fuel consumption can be suppressed.

The variable valve uses a lift variable mechanism capable of causing the intake valve 8 to continuously change the valve lift and a phase variable mechanism capable of continuously changing the phase, in a combined manner. The combined use results in changing IVC (intake valve close period) while fixing IVO (intake valve open period), as shown in FIG. 4(a). Provision of such a variable valve mechanism can realize an internal combustion engine that controls the charging efficiency mainly by means of the variable valve.

This lift variable mechanism has a relationship in which the maximum lift increases with valve working angle as shown in FIG. 4(b). In the case where a required torque is small, the intake air amount can be reduced by reducing the amount of lift while advancing the IVC. Here, the advancement of IVC allows the piston compression amount to be relatively small in comparison with the piston expansion amount. The fuel consumption improvement effect caused by reduction in pump loss and the Miller cycle effect can be expected.

Figure 5:
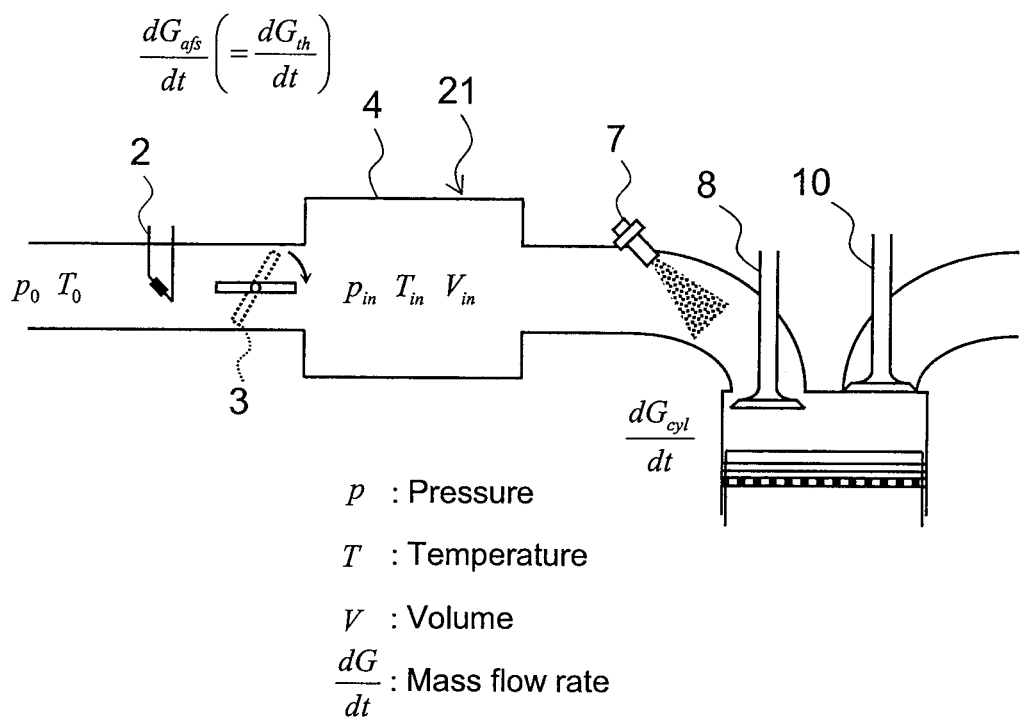
FIG. 5 is a diagram illustrating a configuration of an intake flow path of an internal combustion engine and physical quantities of components.

FIG. 5 is a diagram illustrating a configuration of the intake flow path 21 of the internal combustion engine and physical quantities of components. The airflow sensor 2 is installed upstream of the throttle valve 3. An atmospheric temperature To is detected by a temperature sensor included in the airflow sensor 2. The gas flow rate passing through the opening of the throttle valve 3 can be assumed substantially identical to the airflow sensor flow rate detected by the airflow sensor 2 ($dGafs/dt \equiv dGth/dt$). The gas flow rate ($dGcyl/dt$) flowing into the cylinder can be estimated on the basis of the pressure Pin and the temperature Tin downstream of the throttle valve 3, the rotation speed and the variable valve working amount. Note that reference symbol Po denotes an atmospheric pressure in the diagram.

Figure 6:
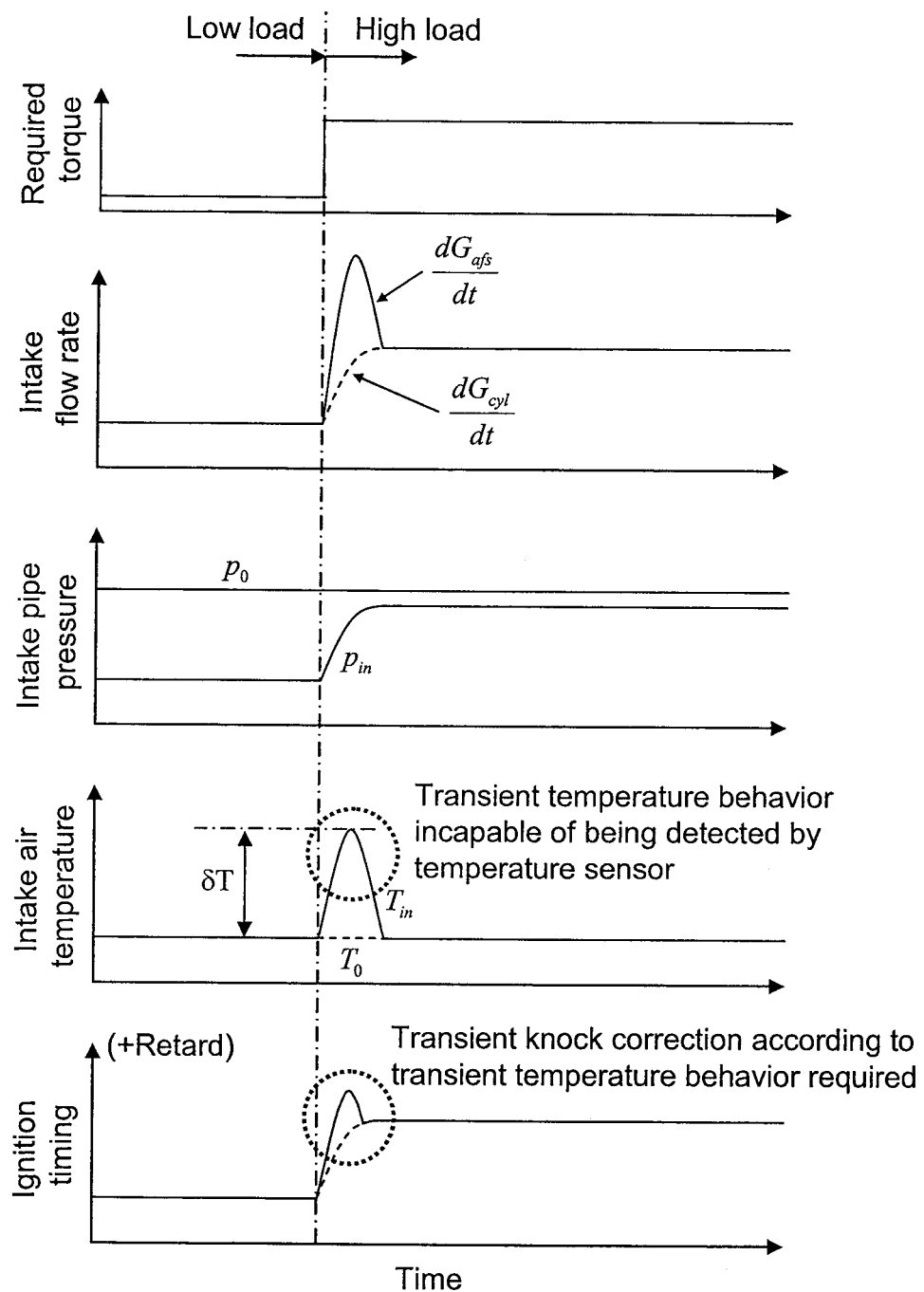
FIG. 6 is a diagram illustrating temporal transition of an intake air flow rate, intake pipe pressure, intake pipe temperature and required ignition timing in the case of abruptly changing the torque from the low to high load states by an operation of opening and closing a throttle valve.

FIG. 6 is a diagram illustrating temporal transition of an intake air flow rate, intake pipe pressure, intake pipe temperature and required ignition timing in the case of abruptly changing the torque from the low to high load states by an operation of opening and closing the throttle valve. When the throttle valve 3 is opened, the gas immediately flows into the intake pipe whose pressure has been suppressed by the throttle valve 3. This leads to temporary overshoot of the airflow sensor flow rate ($dGafs/dt$).

Meanwhile, the pressure Pin in the intake pipe increases, and cylinder flow rate ($dGcyl/dt$) also increases with increase in the intake pipe pressure Pin. Such transition of pressure and flow rate leads to temporary overshoot of the temperature Tin of the gas in the intake pipe. Here, the airflow sensor flow rate ($dGafs/dt$) represents the flow rate of gas flowing into the intake pipe, the cylinder flow rate ($dGcyl/dt$) represents the flow rate flowing from the intake pipe.

The intake pipe temperature Tin is an important effective factor affecting knocking. The transient behavior of the intake pipe temperature Tin is one of the effective factors of knocking caused during transient time. The responsive performance of the temperature sensor for actual use is incapable of detecting the transient behavior of the intake pipe temperature Tin. Accordingly, in order to calculate ignition timing based on the transient behavior of the intake pipe temperature Tin, it is required to separately providing means for estimating the transient behavior.

Figure 7:
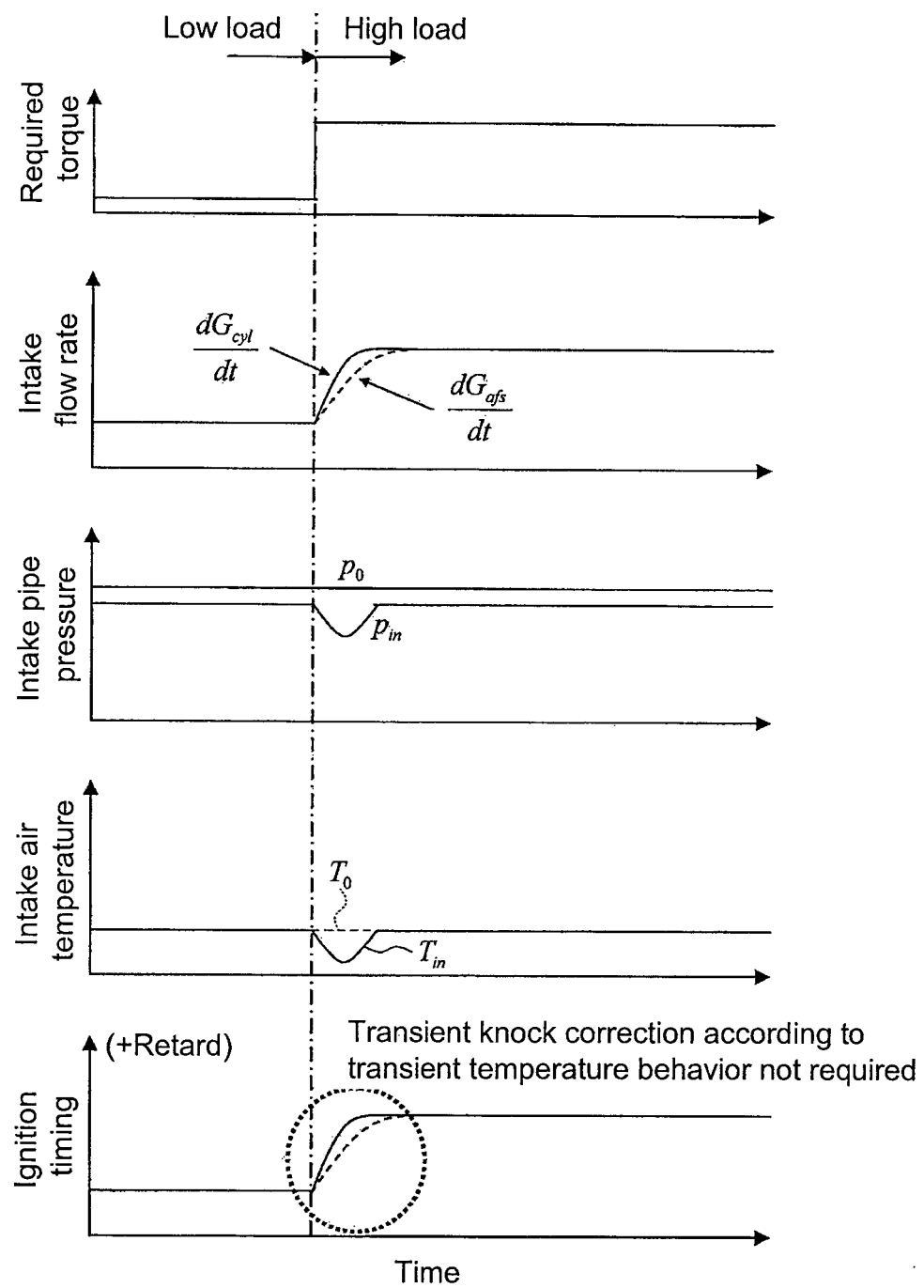
FIG. 7 is a diagram illustrating temporal transition of the intake air flow rate, intake pipe pressure, intake pipe temperature and required ignition timing in the case of abruptly changing the torque from the low to high load states by change of the working angle and lift of the intake valve.

FIG. 7 is a diagram illustrating temporal transition of the intake air flow rate, intake pipe pressure, intake pipe temperature and required ignition timing in the case of abruptly changing the torque from the low to high load states by change of the working angle and lift of the intake valve. The cylinder flow rate ($dGcyl/dt$) increases with increase in the working angle of the intake valve 8. In the system of the internal combustion engine that adjusts the load by means of the intake valve working angle, control is performed by the throttle valve 3 such that the intake pipe pressure Pin is held on the negative pressure side a little closer than the atmospheric pressure Po under a partial load condition.

When increase in the cylinder flow rate ($dGcyl/dt$) reduces the pressure of the intake pipe, the throttle valve 3 is controlled so as to immediately correcting the reduction. Accordingly, the airflow sensor flow rate (dGafs/dt) increases, following the increase in cylinder flow rate (dGcyl/dt). The system of the internal combustion engine that adjusts the load by means of controlling the intake valve working angle leads to the transition of pressure and flow rate as described above. Accordingly, the transient intake pipe temperature does not largely vary.

Accordingly, in the system of the internal combustion engine that adjusts the load by controlling only the intake valve working angle, the necessity of transient knock correction based on the transient behavior of the intake pipe temperature. On the other hand, in the system of the internal combustion engine that adjusts the load in cooperation with the throttle valve 3, the necessity of transient knock correction based on the transient behavior of the intake pipe temperature is high because the transient intake pipe temperature varies in a complicated manner.

Figure 8:
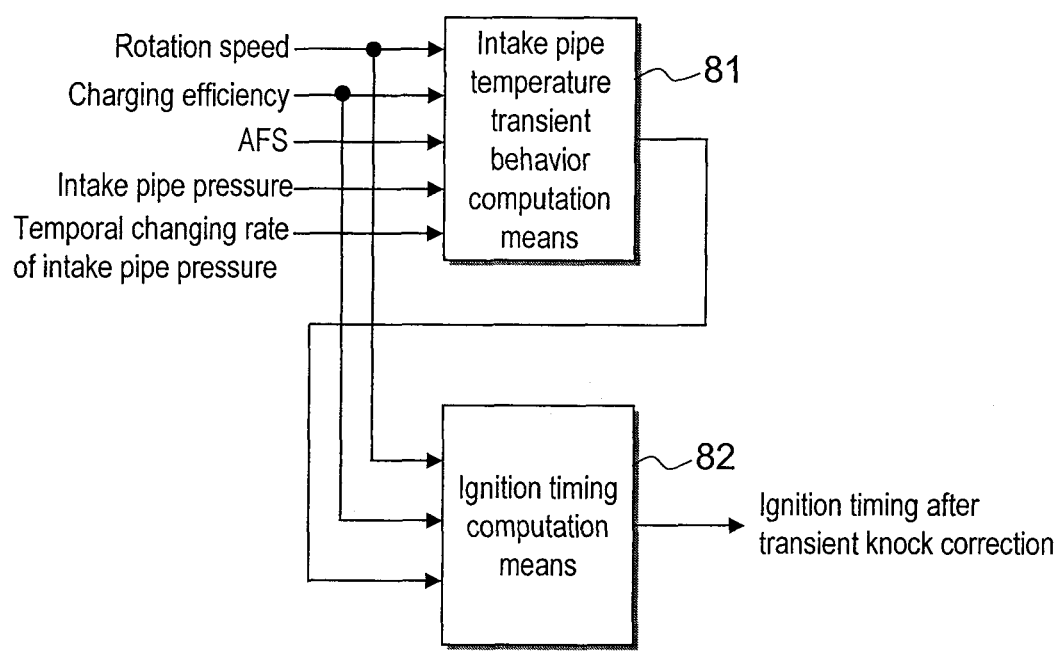
FIG. 8 is an explanatory illustration of a control block diagram for performing transient knock correction on the basis of transient behavior of the intake pipe temperature.

FIG. 8 is an explanatory illustration of a control block diagram for performing transient knock correction on the basis of transient behavior of the intake pipe temperature. Intake pipe temperature transient behavior computation means of a block 81 computes transient behavior of the intake pipe temperature which is difficult to be directly detected by the temperature sensor, on the basis of the rotation speed, charging efficiency, airflow sensor detection flow rate, intake pipe pressure and temporal changing rate thereof.

Every transition of the rotation speed, charging efficiency, airflow sensor detection flow rate, and intake pipe pressure can directly be detected or can be model-estimated at a sufficient high speed in comparison with response characteristics of the temperature sensor. This allows computation of transient temperature behavior, replacing the temperature sensor.

Ignition timing computation means of a block 82 computes ignition timing on the basis of the rotation speed and charging efficiency, and the transient behavior of the intake pipe temperature estimated by the block 81. This configuration thus computes and estimates the transient temperature behavior, which is one of the effective factors of transient knocking, and subsequently inputs this behavior to the ignition timing computation means 82 in which the effects of the intake pipe temperature have been considered. Accordingly, transient knock correction can appropriately be performed on the basis of the transient temperature behavior.

FIG. 9 is a diagram illustrating the blocks 81 and 82 shown in FIG. 8 in detail. Charging efficiency computation means of a block 91 computes a charging efficiency on the basis of the rotation speed, the intake pipe pressure Pin and the variable valve working amount. Furthermore, mass flow rate conversion means of a block 92 computes a cylinder flow rate (dGcyl/dt) on the basis of the charging efficiency and the rotation speed. The charging efficiency computation means of the block 91 and the mass flow rate conversion means of the block 92 configure cylinder flow rate computation means.

Intake pipe pressure temporal changing rate computation means of a block 93 computes the temporal changing rate (dPin/dt) of the intake pipe pressure on the basis of the cylinder flow rate (dGcyl/dt), atmospheric temperature To, intake pipe temperature Tin, and airflow sensor detection flow rate (dGafs/dt) according to the following Equation (1).

[Expression 1]

$$\frac{dp_{in}}{dt} = \frac{\kappa R}{V_{in}}\left(T_{atm}\frac{dG_{afs}}{dt} - T_{in}\frac{dG_{cyl}}{dt}\right) \qquad \text{Equation (1)}$$

In Equation (1), $V_{in}$ represents an intake pipe volume, and $T_{atm}$, represents an atmospheric temperature. Here, κ and R are a ratio of specific heats and a gas constant, respectively. If the working fluid is assumed as air, these can be specified as respective fixed values of 1.4 and 287.03. The intake pipe pressure Pin can be computed by temporally integrating Equation (1).

The system described in this embodiment adopts the configuration in which the intake pipe pressure Pin and the temporal changing rate (dPin/dt) thereof are computed using Equation (1). However, the present invention is not limited thereto. More specifically, a configuration of directly detecting the intake pipe pressure Pin by a pressure sensor can exert analogous effects. In Equation (1), effects of heat transfer to the wall surface of the intake pipe are neglected in terms of reducing the computation load. However, the prediction accuracy can be improved by considering the heat transfer.

Intake pipe temperature transient behavior computation means of a block 94 computes the (dTin/dt) of the intake pipe temperature according to the following Equation (2), on the basis of the intake pipe pressure Pin and the temporal changing rate (dPin/dt) thereof, the cylinder flow rate (dGcyl/dt) and the airflow sensor detection flow rate (dGafs/dt), and computes the transient behavior of the intake pipe temperature by temporally integrating the temporal changing rate.

[Expression 2]

$$\frac{dT_{in}}{dt} = \frac{T_{in}}{p_{in}}\left\{\frac{dp_{in}}{dt} - \frac{RT_{in}}{V_{in}}\left(\frac{dG_{afs}}{dt} - \frac{dG_{cyl}}{dt}\right)\right\} \qquad \text{Equation (2)}$$

Ignition timing computation means of a block 95 computes ignition timing on the basis of the rotation speed, the charging efficiency and the transient behavior of the intake pipe temperature Tin computed by the intake pipe temperature transient behavior computation means of the block 94. As apparent from the Equation (2), the higher the net gas mass temporal changing rate in the intake pipe acquired by subtracting the flow rate of gas flowing out of the intake pipe from the flow rate of gas flowing into the intake pipe is, and the higher the temporal changing rate (dPin/dt) of the intake pipe pressure Pin is, the higher the increase in amount of temperature during transient time becomes, which necessitates transient knock correction to the retard side. This configuration allows accurate estimation of transient temperature behavior that is difficult to be detected with the responsive performance of the temperature sensor, and enables transient knock correction based on the transient temperature behavior to be appropriately performed.

FIG. 10 is a diagram illustrating a polynomial configuring the charging efficiency computation means shown in the block 91 in FIG. 9. As explanatory variables, x1 is set to the rotation speed, x2 is set to the intake pipe pressure, x3 is set to the IVO (intake valve open period), and x4 is set to EVC (exhaust valve close period). The target variable is set to the charging efficiency.

Coefficients A multiplied to respective terms are referred to as partial regression coefficients. The coefficient values are determined according to the least squares method such that the polynomial approximates target data most appropriately. The effects of the rotation speed exerted on the charging efficiency are acquired by terms of partial regression coefficients Nos. 2 to 5. The effects of the intake pipe pressure exerted on the charging efficiency are acquired by terms of partial regression coefficients Nos. 6 to 9. The effects of IVO exerted on the charging efficiency are acquired by terms of partial regression coefficient Nos. 16 to 19. The effects of EVC exerted on the charging efficiency are acquired by terms of partial regression coefficients Nos. 36 to 39.

Furthermore, the effects of interaction between the rotation speed and the intake pipe pressure are acquired by terms of partial regression coefficients Nos. 10 to 15. The effects of interaction between the rotation speed, intake pipe pressure and IVO are acquired by terms of partial regression coefficients Nos. 21 to 35. The effects of interaction between interaction between the rotation speed, intake pipe pressure, IVO and EVC are acquired by terms of partial regression coefficients Nos. 40 to 70.

Such setting of higher order terms and interaction terms in the polynomial allows accurate computation of the charging efficiency in consideration of complicated causality of each input parameter applied to the charging efficiency. Replacement of a large-scale map with the polynomial allows the memory capacity to be significantly reduced. The system of this embodiment adopts the configuration using the quaternary quartic polynomial as means for computing the charging efficiency. However, the present invention is not limited thereto. More specifically, the number of orders or the number of dimensions may be changed in accordance with a relationship between the required accuracy and the allowance of computation load. A stepwise method and the like can appropriately exclude higher order terms or interaction terms without contribution to improvement in accuracy from the polynomial, thereby allowing a trade-off relationship between the accuracy of polynomial and the computation load to be remedied.

The accuracy of the charging efficiency can be improved by adopting a configuration in which the charging efficiency correction values to the rotation speed and the intake pipe pressure are mapped and the output result of the polynomial is trimmed, because there is a case of requiring quintic or higher order for the rotation speed owing to pulsating effects and inertial effects of flows in the intake pipe and the exhaust pipe, and the effect of interference between cylinders.

Here, the system of this embodiment adopts the configuration in which the charging efficiency on the basis of the rotation speed, the intake pipe pressure and the variable valve operation state are computed. However, the present invention is not limited thereto. More specifically, effects of the intake pipe temperature, the atmospheric pressure, the tumble control valve opening, the setting state of the variable intake pipe length system and the like, which are effective factors of the charging efficiency, can further be considered.

FIG. 11 is a diagram illustrating means for correcting an intake pipe transient temperature behavior estimation value using a temperature sensor detection value. Intake pipe temperature temporal changing rate computation means of a block 111 computes the temporal changing rate (dTin/dt) of the intake pipe temperature Tin on the basis of the intake pipe pressure Pin, the temporal changing rate (dPin/dt) thereof, the cylinder flow rate (dGcyl/dt) and the airflow sensor detection flow rate (dGafs/dt), and further temporally integrating this to compute the transient behavior of the intake pipe temperature Tin.

A temperature sensor stationary correction unit A adopts a configuration that takes into consideration a stationary correction amount computed on the basis of the difference between the transient behavior of the intake pipe temperature Tin and the temperature sensor detection value through a low-pass filter 112, with respect to the last value of the transient behavior of the intake pipe temperature Tin. Furthermore, as described in a temperature sensor stationary correction unit B, a configuration may be adopted in which behavior of a temperature detected by a temperature sensor is estimated on the basis of the transient behavior of the intake pipe temperature Tin through a low-pass filter 113 corresponding to response time of the temperature sensor, and the difference with an actual temperature sensor detection value is added to the last value of the transient behavior of the intake pipe temperature Tin. Such a configuration of the temperature sensor stationary correction unit A or B outputs an estimation value of transient temperature behavior under a transient condition, and a temperature sensor value under a stationary condition. Accordingly, in comparison with the case of using only a model estimation value, this configuration can reduce a model error caused by environmental variation, time degradation, individual variation and the like, thereby allowing robust temperature estimation.

Figure 12:
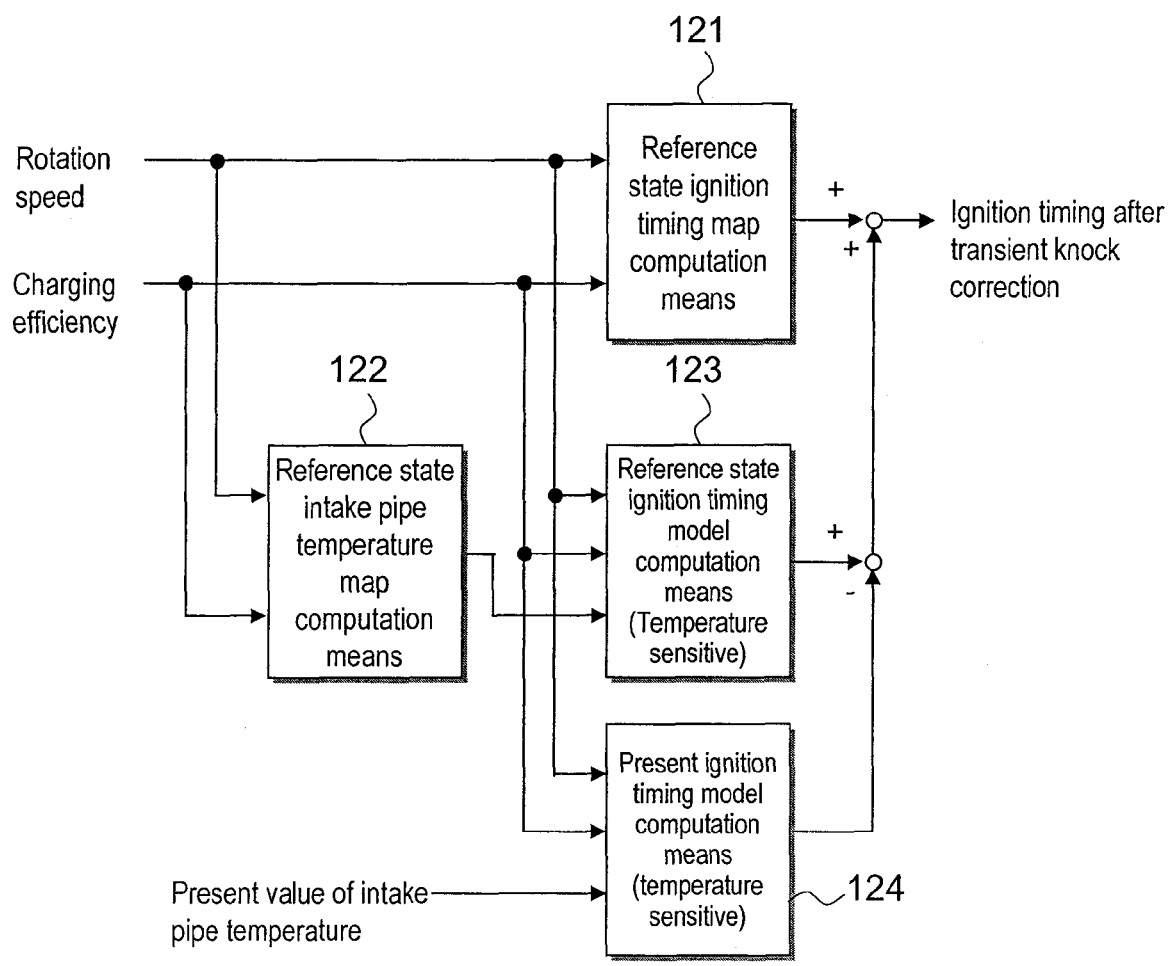
FIG. 12 is a diagram illustrating in detail ignition timing computation means shown in FIG. 8.

FIG. 12 is a diagram illustrating in detail the ignition timing computation means shown in the block 82 in FIG. 8. Reference state ignition timing map computation means of a block 121 performs a map operation of reference state ignition timing on the basis of the rotation speed and the charging efficiency. In the system of this embodiment, stationary reference operation states of various parameters, such as the intake pipe temperature Tin, the air-fuel ratio, and the variable valve working amount, are preliminarily assigned to points that can be considered optimal in terms of the fuel consumption performance, output performance, exhaust performance and the like, on a two-dimensional map having axes of the rotation speed and the charging efficiency. An MBT point or a trace knock point in the case where each of the parameters is in a stationary reference operation state is set on the reference state ignition timing map.

Reference state intake pipe temperature map computation means of a block 122 performs map operation of the intake pipe temperature in the stationary reference operation state, on the basis of the rotation speed and the charging efficiency. Reference state ignition timing model computation means of a block 123 performs model computation of the ignition timing in the reference state, on the basis of the rotation speed, the charging efficiency, and the intake pipe temperature Tin in the stationary reference operation state. Furthermore, present ignition timing model computation means of a block 124 performs model computation of the present ignition timing on the basis of the present value of the intake pipe temperature Tin.

The difference between the ignition timing in the reference state and the present ignition timing that have been model-computed is added to the map-computed result by the reference state ignition timing computation means 121, thereby allowing computation of the transient knock correction ignition timing. Here, the system of this embodiment adopts the configuration in which the intake pipe temperature Tin in the stationary reference operation state is map-computed on the basis of the rotation speed and the charging efficiency. However, the present invention is not limited thereto. In particular, in the normal aspirated internal combustion engine 1, the stationary reference operation state of the intake pipe temperature Tin is substantially constant, irrespective of the operating point. A value corresponding to the ambient temperature assumed for acquiring the MBT point or the trace knock point can be added to the reference state intake pipe temperature, as a fixed value with respect to the rotation speed and the charging efficiency.

FIG. 13 is a diagram illustrating a relationship between the intake pipe temperature and ignition timing under conditions of different rotation speed and charging efficiency. Knocking caused by self ignition of unburned end gas due to compressing operation after ignition and before completion of normal combustion by flame propagation, easily occurs under a lower rotation and higher load condition, and is unlikely to occur under a higher rotation and lower load condition. Accordingly, under a low rotation and high load condition A, a low rotation and medium load condition B, a high rotation and high load condition C and a high rotation and medium load condition D, which are shown in FIG. 13, the amount of transient knock correction is different with respect to the same intake pipe temperature; the lower rotation and higher load condition requires more retard. That is, effects of interaction between the rotation speed and the charging efficiency are exerted on the relationship between the amount of transient knock correction and the intake pipe temperature.

Figure 14:
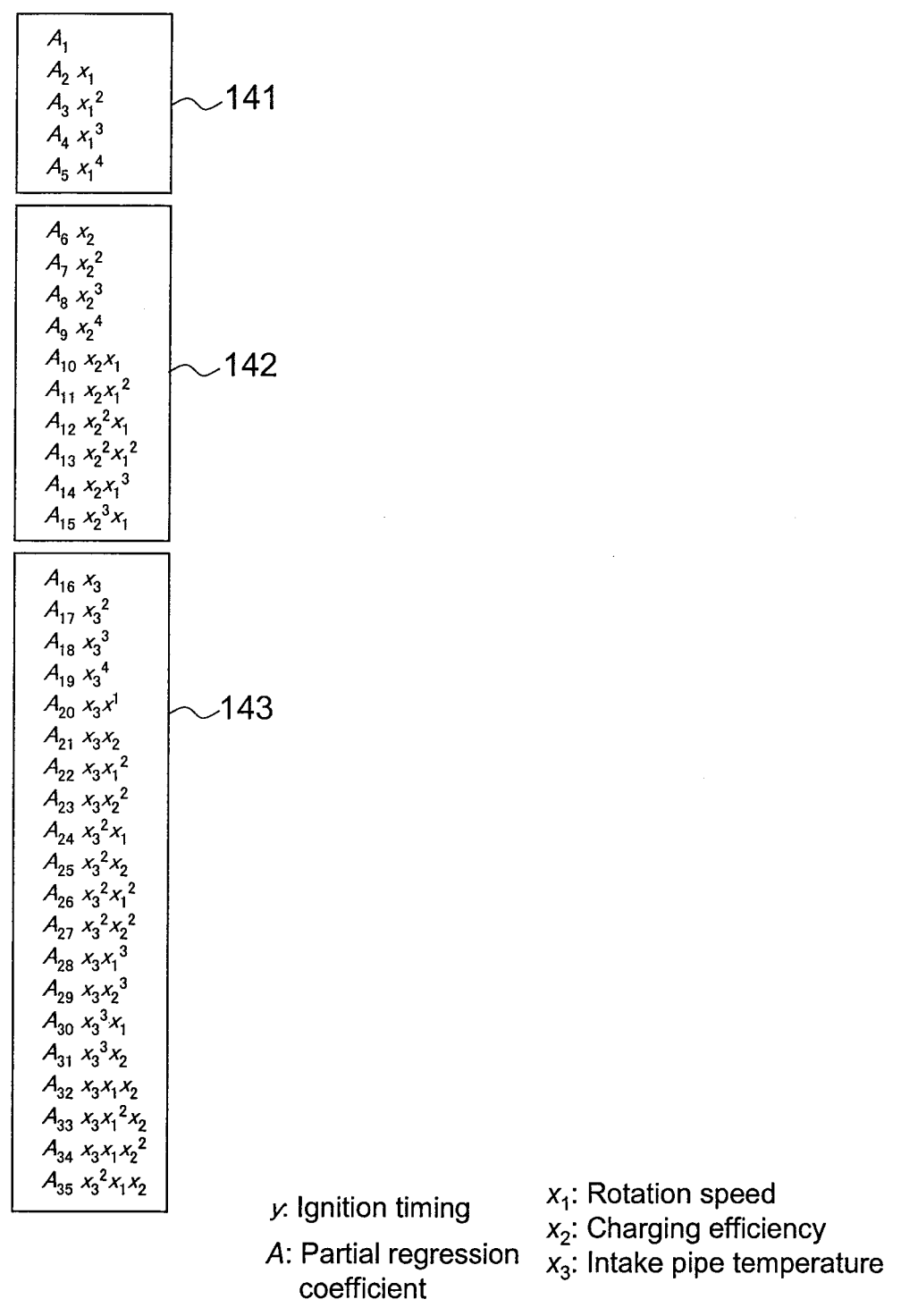

FIG. 14 is a diagram illustrating a polynomial configuring the ignition timing model computation means of the blocks 123 and 124 in FIG. 12. As explanatory variables, x1 is set to the rotation speed, x2 is set to the charging efficiency, and x3 is set to the intake pipe temperature Tin. The ignition timing is set as the target variable. The effects of the rotation speed exerted on the ignition timing are acquired by terms of partial regression coefficient Nos. 2 to 5. The effects of the charging efficiency exerted on the ignition timing are acquired by terms of partial regression coefficient Nos. 6 to 9. The effects of the intake pipe temperature exerted on the ignition timing are acquired by terms of partial regression coefficient Nos. 16 to 19. Furthermore, the effects of interaction between the rotation speed and the charging efficiency are acquired by terms of partial regression coefficient Nos. 10 to 15. The effects of interaction between the rotation speed, the charging efficiency and the intake pipe temperature are acquired by terms of partial regression coefficient Nos. 21 to 35.

Such setting of higher order terms and interaction terms in the polynomial allows accurate computation of the ignition timing in consideration of complicated causality of each input parameter applied to the ignition timing. In particular, knocking more significantly occurs in a lower rotation and higher load condition. Accordingly, in order to appropriately perform transient knock correction, the term of interaction between the rotation speed, the charging efficiency and the intake pipe temperature is indispensable. Replacement of a large-scale map with the polynomial allows the memory capacity to be significantly reduced. The system of this embodiment adopts the configuration that uses a ternary quartic polynomial as means for computing the ignition timing. The present invention is not limited thereto. More specifically, the number of orders or the number of dimensions may be changed according to the relationship between the required accuracy and the allowance of the computation load. Other parameters, such as air-fuel ratio, EGR rate and water temperature, may be adopted as the explanatory variable, and interaction effects thereof can be considered. The stepwise method or the like can appropriately exclude higher order terms and interaction terms that do not contribute to improvement in accuracy from a polynomial, thereby improving a trade-off relationship between the accuracy of the polynomial and the computation load.

FIG. 15 is illustration of a control block diagram for air-fuel ratio rich correction control based on the transient behavior of the intake pipe temperature. As for measures against transient knocking occurring during transient time, in addition to temporary retard correction of the ignition timing according to transient increase in temperature, temporary setting of the air-fuel ratio to a richer side than the target air-fuel ratio can also avoid transient knocking. This is because increase in combustion speed due to richer fuel condition and reduction in temperature due to increase in specific heat is unlikely to cause knocking.

In contrast to reduction in output by retard correction of the ignition timing, the method of avoiding knocking by rich correction can suppress reduction of output while having a disadvantage of degradation in fuel consumption performance, thereby allowing a control system emphasizing acceleration performance to be realized.

Target air-fuel ratio computation means of a block 151 computes the target air-fuel ratio on the basis of the rotation speed and the charging efficiency. Intake pipe temperature temporal changing rate computation means of a block 152 computes the intake pipe temperature temporal changing rate (dTin/dt) on the basis of the intake pipe pressure Pin, the temporal changing rate (dPin/dt) thereof, the cylinder flow rate (dGcyl/dt) and the airflow sensor flow rate (dGafs/dt).

Furthermore, temporal integration of this rate acquires the transient behavior of the intake pipe temperature Tin. The intake pipe temperature transient behavior is subjected to a computation of quasi-stationary variation of the intake pipe temperature Tin acquired through the low-pass filter 153 (filter means). A difference thereof with the transient temperature behavior estimation value is computed (transient temperature increase amount computation means). The difference is supplied to transient knock rich correction means of a block 154, as an amount of temporary increase in temperature $\delta T$, which is in turn supplied to computation of a knocking correction amount during transient knocking.

FIG. 15(b) shows a relationship between the temperature increase during transient time and the air-fuel ratio correction amount required to avoid knocking. As shown in FIG. 15(b), the rich correction amount (air-fuel ratio correction amount) required to avoid knocking tends to increase with a larger value of the temperature increase $\delta T$ during transient time.

However, in the MBT region where knocking does not occur under a relatively low load condition, significant knocking does not occur even with temperature increase during transient time. Accordingly, it is not necessary to perform rich correction during transient time. Thus, the effects of interaction between the rotation speed and the charging efficiency are exerted on the relationship between the temperature increase during transient time and the rich correction amount. Accordingly, setting of a different rich correction amount according to the operating point allows an appropriate transient knock correction control to be realized.

In the aforementioned embodiment, the description has been made on the case of using the intake pipe temperature estimation value during the transient behavior of the intake pipe temperature. However, a configuration may be adopted in which the value detected by a temperature sensor is used as it is on low frequency components where the temperature sensor is responsive to variation in actual intake pipe temperature, and the intake pipe temperature estimation value is used on high frequency components where the temperature sensor is not responsive thereto.

For instance, means for detecting intake pipe temperature by a temperature sensor; means for setting a detection value detected by a temperature sensor to temperature behavior for a frequency component lower than temperature sensor detection response performance; and means for setting an intake pipe temperature estimation value based on a flow rate of gas flowing into the intake pipe, a flow rate of gas flowing from the intake pipe, an intake pipe pressure and a temporal changing rate of an intake pipe pressure, to temperature behavior for a frequency component higher than the temperature sensor detection response performance, may be provided.

Accordingly, robustness of the intake pipe against the transient temperature behavior can be improved; transient knocking can appropriately be prevented in the case of computing the ignition timing during transient time of the internal combustion engine on the basis of the transient behavior of the intake pipe.

Second Embodiment

Next, a second embodiment of the present invention will be described.

Figure 16:
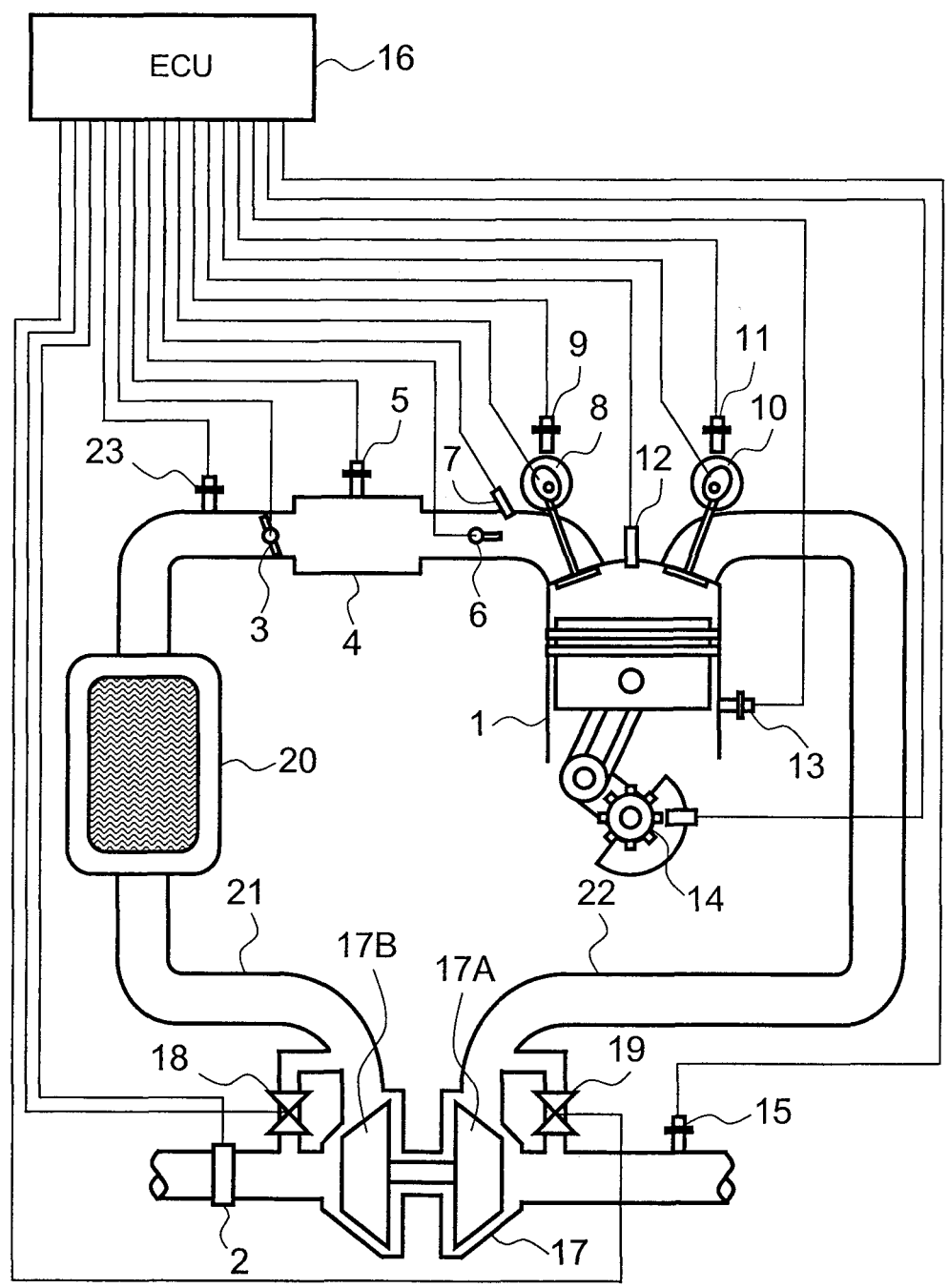
FIG. 16 is a diagram illustrating a configuration of a system according to a second embodiment.

FIG. 16 is a diagram illustrating a configuration of a system of an internal combustion engine in this embodiment.

The system of this embodiment is the same as the system of the first embodiment, except for the point that the intake flow path 21 and the exhaust flow path 22 are newly connected with a turbocharger 17 and an intercooler 20.

The turbocharger 17 includes an exhaust turbine 17A for converting energy of the exhaust gas into rotational movement of turbine blades, and a compressor (compression machine) 17B for compressing intake gas by means of rotation of the compressor blades connected to the turbine blades. The compressor 17B communicates with the intake flow path 21. The turbine 17A communicates with the exhaust flow path 22.

The turbocharger 17 includes an air bypass valve 18 and a waste gate valve 19. The air bypass valve 18 is provided for preventing pressure at sites downstream of the compressor and upstream of the throttle valve 3 from excessively increasing. In a charging state, when the throttle valve 3 is abruptly closed, opening of the air bypass valve 18 allows the gas at a site downstream of the compressor 17B to flow backward to a site upstream of the compressor 17B, thereby enabling the charging pressure to be reduced.

On the other hand, the waste gate valve 19 is provided for preventing the internal combustion engine 1 from reaching an excessive charging level. When the charging pressure detected by the intake pressure sensor 5 reaches a prescribed value, opening of the waste gate valve 19 guides the exhaust gas to bypass the exhaust turbine 17A, thereby allowing the charging to be suppressed or maintained. The intercooler 20 for forcedly cooling the intake pipe temperature having increased by adiabatic compression is provided downstream of the turbocharger 2 on the compressor side. A charged temperature sensor 23 for measuring the temperature having increased by charging and then forcedly cooled by the intercooler 20 is installed downstream of the intercooler 20.

Figure 17:
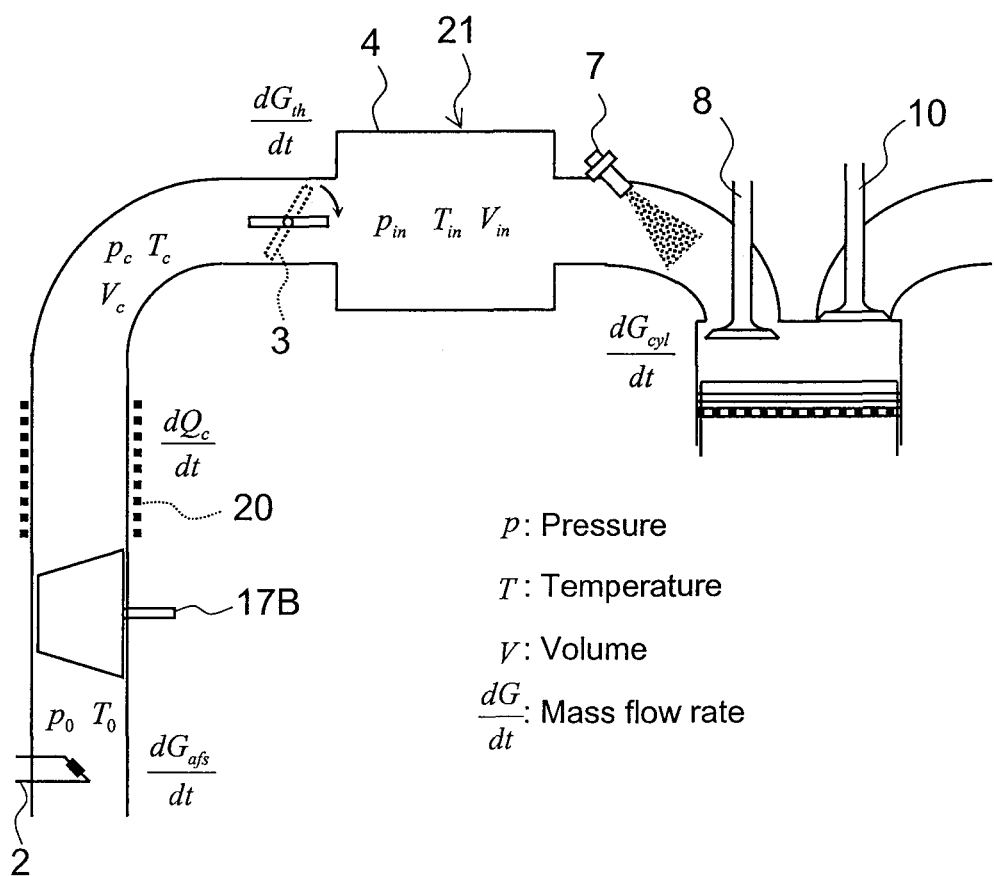
FIG. 17 is a diagram illustrating a configuration of an intake pipe of a turbocharged internal combustion engine and physical quantities of components.

FIG. 17 is a diagram illustrating a configuration of the intake pipe of the turbocharged internal combustion engine 1 and physical quantities of components. The airflow sensor 2 is mounted upstream of the compressor 17B. The atmospheric temperature can be detected by a temperature sensor embedded in the airflow sensor 2. In the turbocharged internal combustion engine 1, the flow rate of gas passing through the compressor 17B can be assumed identical to the airflow sensor flow rate (dGafs/dt) detected by the airflow sensor 2. However, the flow rate of gas passing through the opening of the throttle valve 3 is sometimes largely different from the airflow sensor flow rate (dGafs/dt) when the throttle valve is opened or closed. Accordingly, it is required to detect or estimate states in at least two regions upstream and downstream of the throttle valve 3. The turbocharged internal combustion engine 1 can estimate the flow rate of gas flowing into the cylinder, on the basis of the pressure, the temperature, the rotation speed, and the variable valve working amount that are downstream of the throttle valve 3.

Figure 18:
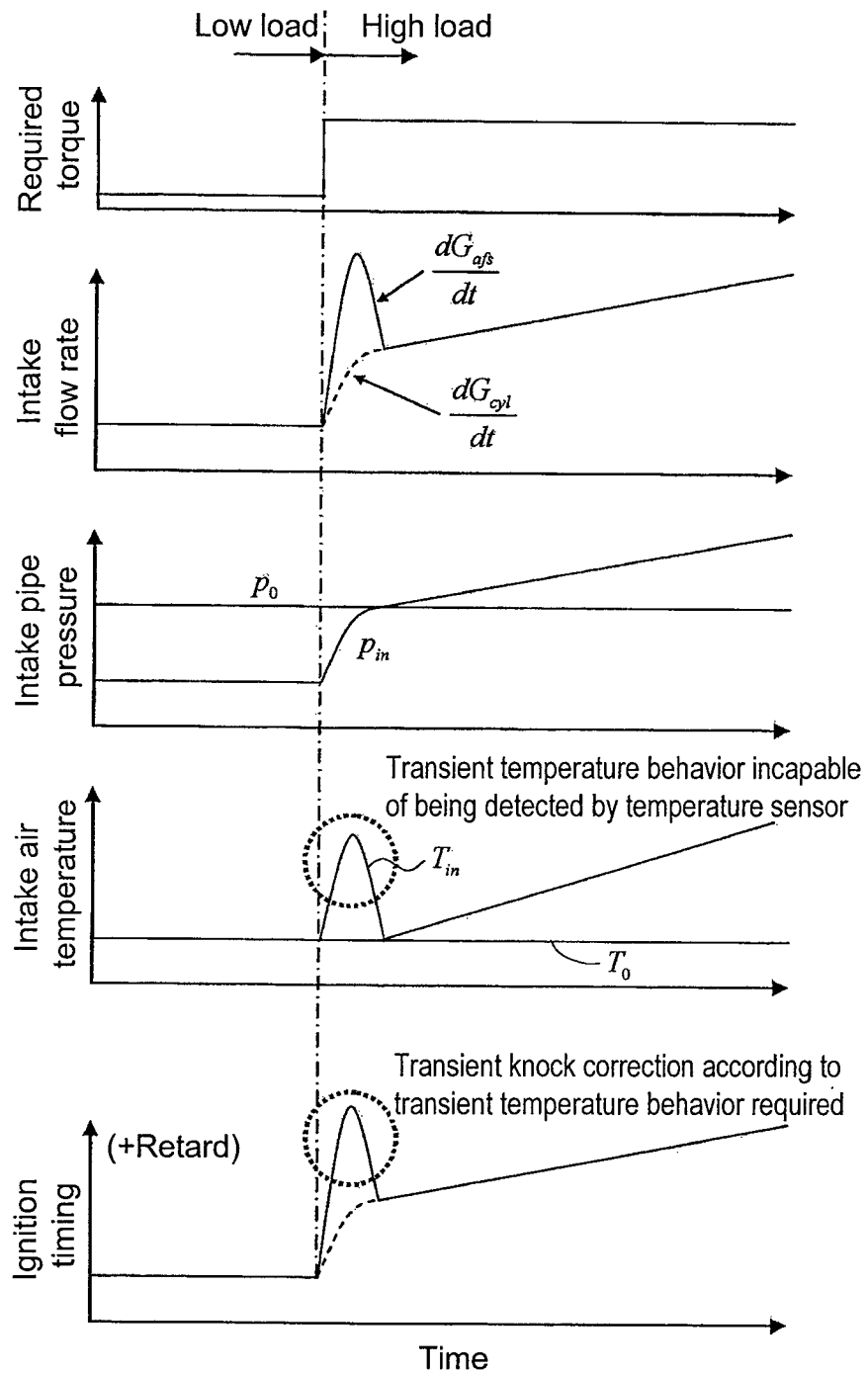
FIG. 18 is a diagram illustrating temporal transition of an intake air flow rate, intake pipe pressure, intake pipe temperature and required ignition timing in the turbocharged internal combustion engine in the case of abruptly changing the torque from the low to high load states by operation of opening and closing a throttle valve.

FIG. 18 is a diagram illustrating temporal transition of the intake air flow rate, intake pipe pressure, intake pipe temperature and required ignition timing in the turbocharged internal combustion engine in the case of abruptly changing the torque from the low to high load states by operation of opening and closing a throttle valve.

When the throttle valve 3 is opened, the gas immediately flows into the intake pipe whose pressure has been suppressed by the throttle valve 3. Accordingly, this leads to temporary overshoot of the airflow sensor flow rate (dGafs/dt). Meanwhile, the pressure Pin in the intake pipe increases to the atmospheric pressure Po, and cylinder flow rate (dGcyl/dt) gradually increases with the intake pipe pressure Pin.

Subsequently, the charging effect by the turbocharger 17 starts gradual increase of intake pipe pressure Pin. Such transition of pressure and flow rate leads to temporary overshoot of the temperature Tin of the gas in the intake pipe and subsequent increase in temperature with increase in charging pressure. The intake pipe temperature Tin is an important effective factor on knocking. The transient behavior of the intake pipe temperature Tin is one effective factor of knocking occurring during transient time. The responsive performance of the charged temperature sensor 23 described in this embodiment can follow increase due to the charging, but cannot detect the transient behavior of the intake pipe temperature Tin by the time when the intake pipe pressure Pin reaches the atmospheric pressure Po.

As described above, the flow in an intake pipe constitutes an open system accompanied by inflow and outflow of mass and energy by transport due to working fluid. Accordingly, during transient time accompanied by temporal change in mass and energy of gas in the intake pipe, the transient behavior of the intake pipe temperature cannot be detected only by the intake pipe pressure sensor. Thus, the turbocharged internal combustion engine 1 is also required to include means for estimating the transient behavior of the intake pipe temperature Tin.

Figure 19:
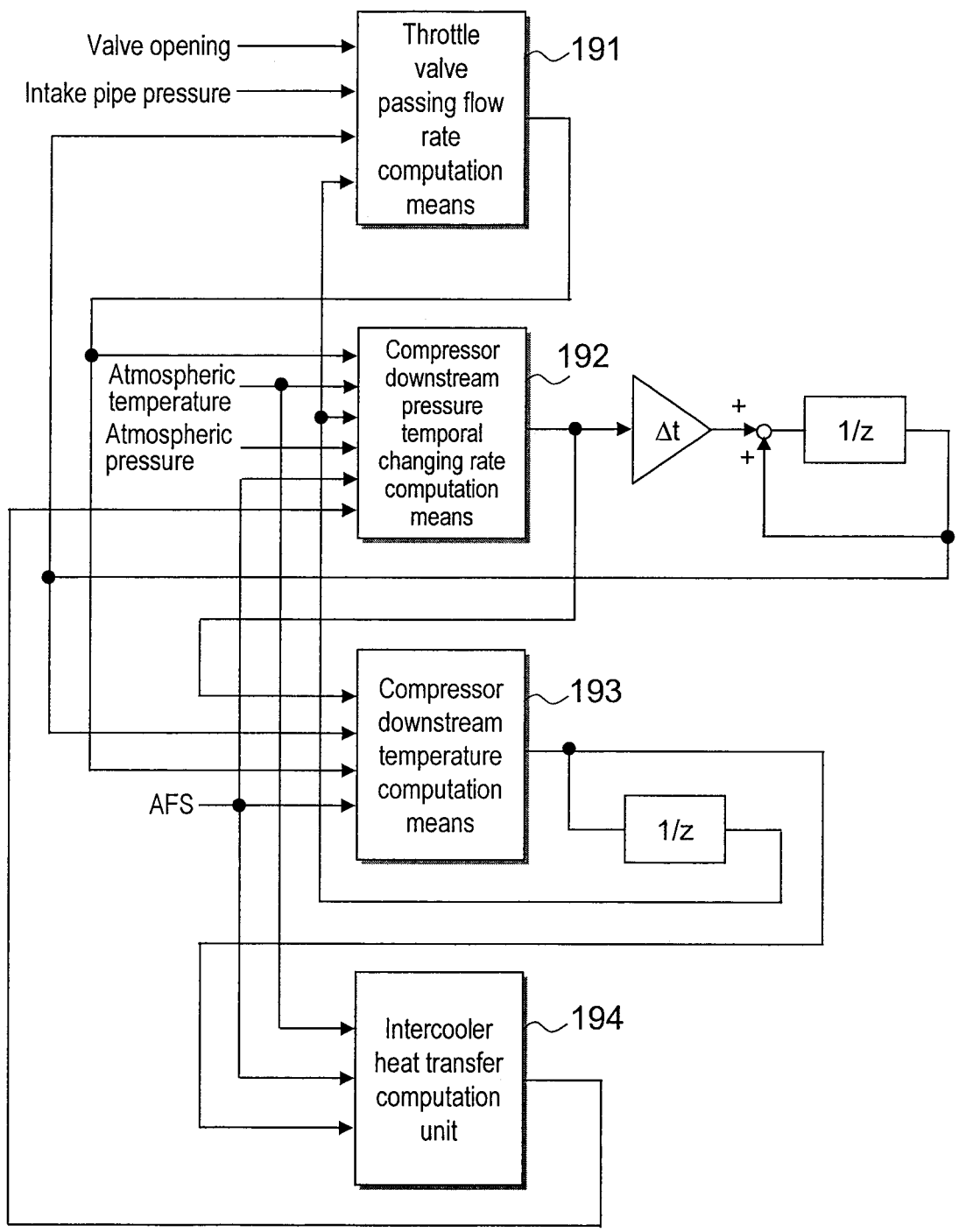
FIG. 19 is a diagram illustrating a compressor downstream pressure and temperature computation means in the turbocharged internal combustion engine.

FIG. 19 is a diagram illustrating a compressor downstream pressure and temperature computation means in the turbocharged internal combustion engine. Throttle valve passing flow rate computation means of a block 191 computes the throttle valve passing flow rate (dGth/dt), according to the following equation, on the basis of the valve opening of the throttle valve 3, intake pipe pressure Pin (pressure downstream of the throttle valve), compressor downstream pressure Pc (pressure upstream of the throttle valve), and compressor downstream temperature Tc (temperature upstream of the throttle valve).

[Expression 3]

$$\frac{dG_{th}}{dt} = C_D A_{th} p_c \sqrt{\frac{2}{RT_c}} \cdot \Psi\left(\frac{p_{in}}{p_c}\right)$$

Equation (3)

Here, $C_D$ and $A_{th}$ are a valve flow rate coefficient and a valve opening area, respectively. The valve opening area $A_{th}$ can be acquired on the basis of the geometrical shape of the throttle valve opening, the valve diameter and the like. $\psi$ is a function of pressure ratio upstream and downstream of the valve, which is provided in the following equation in the case of $\kappa=1.4$.

[Expression 4]

$$\begin{cases} \Psi\left(\frac{p_{in}}{p_c}\right) = 0.4842, \text{ for } \frac{p_{in}}{p_c} < 0.5282 \\ \Psi\left(\frac{p_{in}}{p_c}\right) = \sqrt{3.5\left\{\left(\frac{p_{in}}{p_c}\right)^{1.43} - \left(\frac{p_{in}}{p_c}\right)^{1.71}\right\}}, \text{ for } \frac{p_{in}}{p_c} \geq 0.5282 \end{cases}$$

Equation (4)

Compressor downstream pressure temporal changing rate computation means of a block 192 computes the compressor downstream pressure temporal changing rate (dPc/dt), according to the following equation, on the basis of the throttle valve passing flow rate (dGth/dt), atmospheric temperature To, atmospheric pressure Po, compressor downstream temperature Tc, airflow sensor flow rate (dGafs/dt) and intercooler heat transfer amount (dQc/dt).

[Expression 5]

$$\frac{dp_c}{dt} = \frac{\kappa R}{V_c}\left\{T_{atm}\left(\frac{p_c}{p_{atm}}\right)^{\frac{\kappa-1}{\kappa}}\frac{dG_{afs}}{dt} - T_c\frac{dG_{th}}{dt}\right\} + \frac{\kappa-1}{V_c}\frac{dQ_c}{dt} \quad \text{Equation (5)}$$

The compressor downstream pressure Pc can be computed by temporal integration of the compressor downstream pressure temporal changing rate (dPc/dt). The system described in this embodiment adopts the configuration of computing the compressor downstream pressure Pc and the temporal changing rate (dPc/dt) thereof using Equation (5). However, the present invention is not limited thereto. That is, a configuration in which the compressor downstream pressure Pc is directly detected by a pressure sensor also exerts analogous advantageous effects.

Compressor downstream temperature computation means of a block 193 computes the compressor downstream temperature temporal changing rate (dTc/dt), according to a following Equation (6), on the basis of the compressor downstream pressure Pc, temporal changing rate (dPc/dt) thereof, throttle valve passing flow rate (dGth/dt) and airflow sensor flow rate (dGafs/dt), and further computes the compressor downstream temperature Tc by temporal integration thereof.

Since computation of Equations (3), (4) and (5) includes an exponential function computation, the computation load is excessive for executing on-board by the ECU 16. Thus, appropriate replacement of only the exponential function part with a table or map computation enables the computation load to be reduced.

[Expression 6]

$$\frac{dT_c}{dt} = \frac{T_c}{p_c}\left\{\frac{dp_c}{dt} - \frac{RT_c}{V_c}\left(\frac{dG_{afs}}{dt} - \frac{dG_{th}}{dt}\right)\right\} \quad \text{Equation (6)}$$

An intercooler heat transfer computation unit of a block 194 computes the intercooler heat transfer amount (dQc/dt) on the basis of the atmospheric temperature To, airflow sensor flow rate (dGafs/dt), and compressor downstream temperature Tc. The aforementioned configuration allows accurate estimation of transient behavior of the compressor downstream pressure Pc and the compressor downstream temperature Tc, even when the throttle valve of the turbocharged internal combustion engine 1 is opened or closed.

Figure 20:
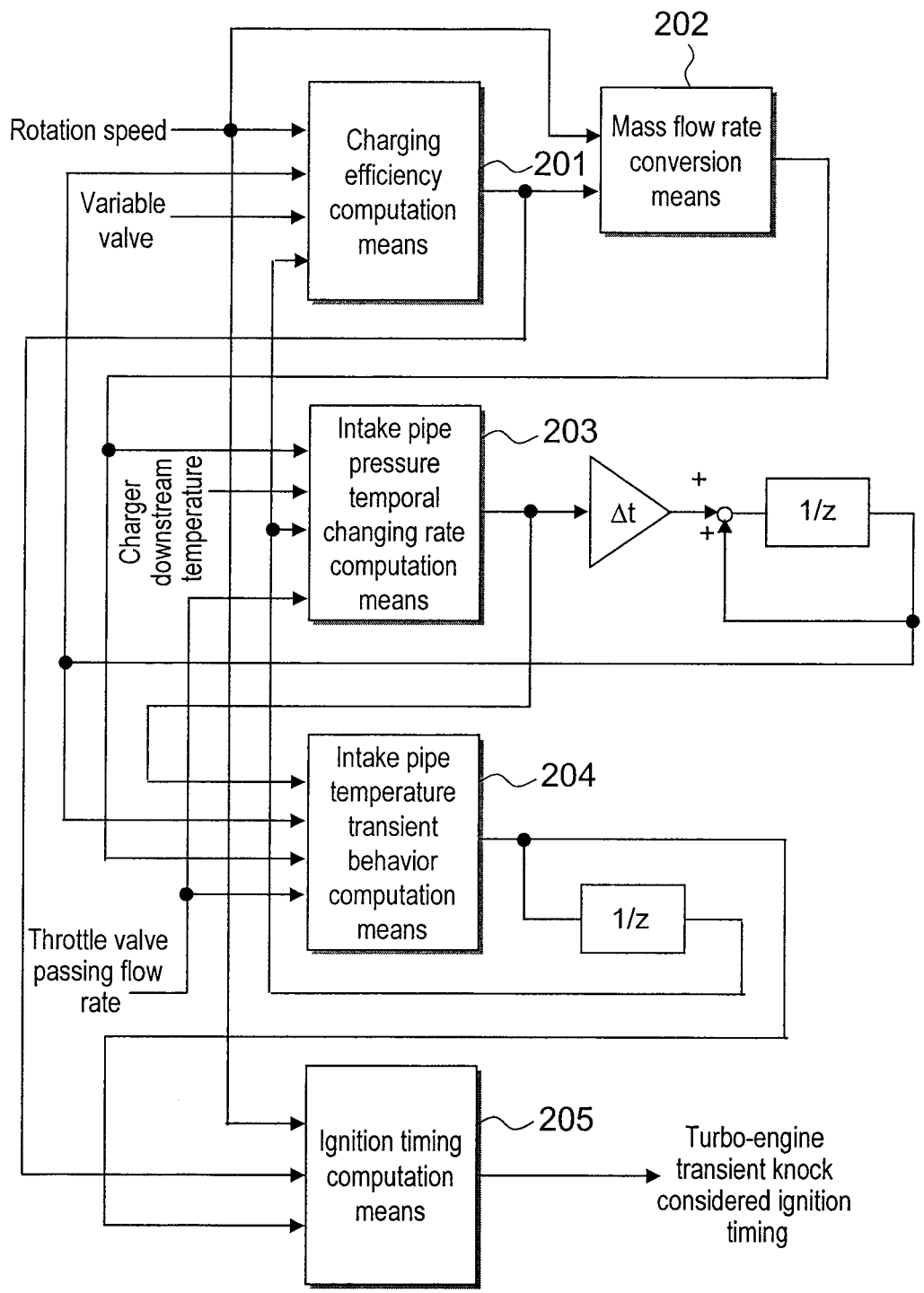
FIG. 20 is a diagram illustrating in detail the intake pipe temperature transient behavior computation means and the ignition timing computation means shown in FIG. 8, provided that a turbocharged internal combustion engine is adopted.

FIG. 20 is a diagram illustrating the blocks 81 and 82 shown in FIG. 8 in detail, provided that the turbocharged internal combustion engine is adopted. At block 201, a charging efficiency is computed on the basis of the rotation speed, the intake pipe pressure Pin and the variable valve working amount. Further, mass flow rate conversion means of a block 202 performs conversion into the cylinder flow rate (dGcyl/dt), on the basis of the charging efficiency and the rotation speed. Intake pipe pressure temporal changing rate computation means of a block 203 computes the temporal changing rate (dPin/dt) of the intake pipe pressure Pin, according to the following Equation (7), on the basis of the cylinder flow rate (dGcyl/dt), compressor downstream temperature Tc, intake pipe temperature Tin, and throttle valve passing flow rate (dGth/dt).

[Expression 7]

$$\frac{dp_{in}}{dt} = \frac{\kappa R}{V_{in}}\left(T_c\frac{dG_{th}}{dt} - T_{in}\frac{dG_{cyl}}{dt}\right) \quad \text{Equation (7)}$$

The intake pipe pressure Pin can be computed by temporal integration of Equation (7). The system described in this embodiment adopts the configuration of computing the intake pipe pressure Pin and the temporal changing rate (dPin/dt) thereof using Equation (7). However, the present invention is not limited thereto. More specifically, a configuration in which the intake pipe pressure Pin is directly detected by a pressure sensor also exerts analogous advantageous effects. Intake pipe temperature transient behavior computation means of a block 204 computes the temporal changing rate (dTin/dt) of the intake pipe temperature Tin according to the following Equation (8) on the basis of the intake pipe pressure Pin, temporal changing rate (dPin/dt) thereof, cylinder flow rate (dGcyl/dt) and throttle valve passing flow rate (dGth/dt), and further computes the transient behavior of the intake pipe temperature Tin by temporal integration thereof.

[Expression 8]

$$\frac{dT_{in}}{dt} = \frac{T_{in}}{p_{in}}\left\{\frac{dp_{in}}{dt} - \frac{RT_{in}}{V_{in}}\left(\frac{dG_{th}}{dt} - \frac{dG_{cyl}}{dt}\right)\right\} \quad \text{Equation (8)}$$

Ignition timing computation means of a block 205 computes the ignition timing, on the basis of the rotation speed, the charging efficiency and the transient behavior of the intake pipe temperature Tin computed by the intake pipe temperature transient behavior computation means of the block 204. Such configuration enables the turbocharged internal combustion engine 1 to also accurately estimate the transient temperature behavior, which is difficult to be detected with the responsive performance of the temperature sensor, and further allows the transient knock correction based on the transient temperature behavior to be accurately performed.

FIG. 21 is a diagram illustrating a polynomial configuring the charging efficiency computation means shown in the block 201 in FIG. 20. As explanatory variables, x1 is set to the rotation speed, x2 is set to the intake air relative pressure, x3 is set to IVO, x4 is set to EVC, and x5 is set to the intake pipe temperature. The target variable is set to charging efficiency.

The effects of the rotation speed exerted on the charging efficiency are acquired by terms of partial regression coefficient Nos. 2 to 5. The effects of the intake pipe pressure Pin exerted on the charging efficiency are acquired by terms of partial regression coefficient Nos. 6 to 9. The effects of the IVO exerted on the charging efficiency are acquired by terms of partial regression coefficient Nos. 16 to 19. The effects of the EVC exerted on the charging efficiency are acquired by terms of partial regression coefficient Nos. 36 to 39. Furthermore, the effects of the intake pipe temperature exerted on the charging efficiency are acquired by terms of partial regression coefficient Nos. 71 to 74.

Moreover, the effects of interaction between the rotation speed and the intake pipe pressure Pin are acquired by terms of partial regression coefficient Nos. 10 to 15. The effects of interaction between the rotation speed, the intake pipe pressure Pin and IVO are acquired by terms of partial regression coefficient Nos. 21 to 35. The effects of interaction between the rotation speed, intake pipe pressure Pin, IVO and EVC are acquired by terms of partial regression coefficient Nos. 40 to 70. The effects of interaction between the rotation speed, intake pipe pressure Pin, IVO, EVC and intake pipe temperature are acquired by terms of partial regression coefficient Nos. 75 to 126.

Such setting of higher order terms and interaction terms in the polynomial allows accurate computation of the charging efficiency in consideration of complicated causality of each input parameter applied to the charging efficiency. Replacement of a large-scale map with the polynomial allows the memory capacity to be significantly reduced.

The system of this embodiment adopts the configuration using the quinary quartic polynomial as means for computing the charging efficiency. The present invention is not limited thereto. More specifically, the number of orders and the number of dimensions may be changed according to relationship between the required accuracy and the allowance of the computation load. The stepwise method or the like can appropriately exclude higher order terms and interaction terms that do not contribute to improvement in accuracy from the polynomial, thereby improving a trade-off relationship between the accuracy of the polynomial and the computation load.

The accuracy of the charging efficiency can be improved by adopting a configuration in which the charging efficiency correction values to the rotation speed and the intake pipe pressure Pin is mapped and the output result of the polynomial is trimmed, because there is a case of requiring quintic or higher order for the rotation speed owing to pulsating effects and inertial effects of flows in the intake pipe and the exhaust pipe, and the effect of interference between cylinders. The atmospheric pressure Po and the tumble control valve opening, which are effective factors of the charging efficiency, can further be considered.

Figure 22:
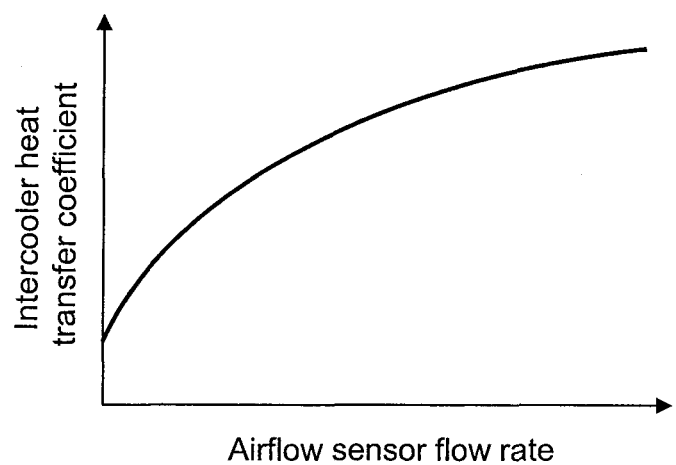
FIG. 22 is a diagram illustrating a relationship between the airflow sensor flow rate and intercooler heat transfer coefficient.

FIG. 22 is a diagram illustrating a relationship between an airflow sensor flow rate and intercooler heat transfer coefficient. The intercooler heat transfer coefficient (dQc/dt) increases with increase in the airflow sensor flow rate (dGafs/dt). The intercooler heat transfer computation unit of the block 194 shown in FIG. 19 multiplies the product of the intercooler heat transfer coefficient (dQc/dt) and the area of the intercooler cooling part by the difference between the atmospheric temperature To and the compressor downstream temperature Tc, and uses the relationship of the heat transfer coefficient shown in FIG. 22, thereby computing the heat transfer amount. According to such configuration, the gas heated by charging is forcedly cooled by the intercooler 20, thereby allowing accurate estimation of the subsequent temperature behavior. Further, a temperature sensor is disposed downstream of the charger or the throttle valve, and the temperature sensor stationary correction unit A or B shown in FIG. 11 is used together with the temperature sensor detection value, thereby allowing temperature estimation that is robust to environmental variation, time degradation, individual variation and the like, even in the turbocharged internal combustion engine 1.

An internal combustion engine control device of the present invention includes intake pipe temperature transient behavior computation means for estimating transient behavior of an intake pipe temperature on the basis of a flow rate of gas flowing into an intake pipe, a flow rate of gas flowing from the intake pipe, an intake pipe pressure, and a temporal changing rate of the intake pipe pressure. Accordingly, for instance, the device can appropriately prevent transient knocking from occurring, by computing ignition timing during transient time of the internal combustion engine on the basis of the estimated transient behavior of the intake pipe. Even in the case where various acceleration patterns are provided, the transient temperature behavior can be computed on-board by the ECU. Accordingly, the amount of transient knock correction is not necessarily applied to an actual machine on every acceleration pattern, thereby allowing actual machine application man-hours to be reduced.

According to the internal combustion engine control device of the present invention, in a case where the internal combustion engine includes a throttle valve that adjusts a flow rate of gas flowing upstream of the intake pipe, the intake pipe temperature transient behavior computation means sets a throttle valve passing flow rate of gas passing through the throttle valve, as a flow rate of gas flowing into the intake pipe. This allows accurate estimation of the transient temperature behavior of the intake pipe. Accordingly, in the case of computing the ignition timing during transient time of the internal combustion engine on the basis of the transient behavior of the intake pipe, transient knocking can appropriately be prevented.

In the case where the internal combustion engine further includes an airflow sensor that detects a flow rate of gas flowing upstream of the intake pipe, the intake pipe temperature transient behavior computation means can regard an airflow part gas flow rate detected by the airflow sensor as the throttle valve passing flow rate, and set the flow rate as a flow rate of gas flowing into the intake pipe.

According to the internal combustion engine control device of the present invention, in a case where the internal combustion engine includes a throttle valve that adjusts a flow rate of gas flowing in the intake pipe, the device includes throttle valve passing flow rate computation means for computing a throttle valve passing flow rate of gas passing through the throttle valve on the basis of a valve opening of the throttle valve, a pressure upstream of the throttle valve, a pressure downstream of the throttle valve, and a temperature upstream of the throttle valve, and the intake pipe temperature transient behavior computation means sets the throttle valve passing flow rate computed by the throttle valve passing flow rate computation means, as a flow rate of gas flowing into the intake pipe. Accordingly, even an internal combustion engine including no airflow sensor provided upstream of the throttle valve can accurately estimate the transient temperature behavior of the intake pipe, and appropriately prevent transient knocking in the case of computing the ignition timing during transient time of the internal combustion engine on the basis of the transient behavior of the intake pipe.

According to the internal combustion engine control device of the present invention, in a case where the internal combustion engine includes a variable valve mechanism capable of changing a valve opening and closing timing or amount of lift on the basis of a preset working amount, the device further includes cylinder flow rate computation means for computing a cylinder flow rate of gas flowing into a cylinder of the internal combustion engine, on the basis of a polynomial that employs at least a rotation speed of the internal combustion engine, the intake pipe pressure, a working amount of the variable valve, and the intake pipe temperature as input parameters and the intake pipe temperature transient behavior computation means sets the cylinder flow rate of gas computed by the cylinder flow rate computation means, as a flow rate of gas flowing from the intake pipe. Accordingly, the setting allows accurate computation of the charging efficiency in consideration of complicated causality of each input parameter applied to the charging efficiency. Furthermore, replacement of a large-scale map with the polynomial allows the memory capacity to be significantly reduced.

According to the internal combustion engine control device of the present invention, the cylinder flow rate computation means may have a configuration including: charging efficiency computation means for computing a charging efficiency on the basis of the rotation speed, the intake pipe pressure, and a working amount of the variable valve; and mass flow rate conversion means for conversion into the cylinder flow rate based on the charging efficiency computed by the charging efficiency computation means and the rotation speed.

According to the internal combustion engine control device of the present invention, in a case where the internal combustion engine includes a throttle valve that adjusts a flow rate of gas flowing upstream of the intake pipe, the device further includes: intake pipe pressure temporal changing rate computation means for computing a temporal changing rate of the intake pipe pressure, on the basis of a flow rate of gas flowing into the intake pipe, a flow rate of gas flowing from the intake pipe, a temperature upstream of the throttle valve, and the intake pipe temperature; and intake pipe pressure computation means for computing the intake pipe pressure, on the basis of a temporal changing rate of the intake pipe pressure computed by the intake pipe pressure temporal changing rate computation means. Accordingly, even an internal combustion engine including no pressure sensor for detecting an intake pipe pressure can accurately estimate the transient temperature behavior of the intake pipe, and appropriately prevent transient knocking in the case of computing the ignition timing during transient time of the internal combustion engine on the basis of the transient behavior of the intake pipe.

According to the internal combustion engine control device of the present invention, in a case where the internal combustion engine includes a turbocharger, an airflow sensor detecting a flow rate of gas flowing through a compressor of the turbocharger, and a throttle valve adjusting a flow rate of gas flowing downstream of the compressor, the intake pipe temperature transient behavior computation means sets a compressor passing flow rate of gas flowing through the compressor, as a throttle valve upstream gas inflow rate of gas flowing into downstream of the compressor and upstream of the throttle valve, sets a throttle valve passing flow rate of gas flowing through the throttle valve of the intake pipe, as a throttle valve upstream gas outflow rate of gas flowing out downstream of the compressor and upstream of the throttle valve, and estimates transient behavior of throttle valve upstream intake pipe temperature at a site downstream of the compressor, on the basis of the throttle valve upstream gas inflow rate, the throttle valve upstream gas outflow rate, the throttle valve upstream intake pipe pressure, and a temporal changing rate of the throttle valve upstream intake pipe pressure. Accordingly, even an internal combustion engine including a turbocharger can accurately estimate the transient temperature behavior of the intake pipe, and appropriately prevent transient knocking in the case of computing the ignition timing during transient time of the internal combustion engine on the basis of the transient behavior of the intake pipe.

The internal combustion engine control device of the present invention further includes means for detecting an intake pipe temperature by a temperature sensor; means for setting a detection value detected by the temperature sensor to temperature behavior for a frequency component lower than temperature sensor detection response performance; means for setting an intake pipe temperature estimation value based on a flow rate of gas flowing into the intake pipe, a flow rate of gas flowing from the intake pipe, an intake pipe pressure, and a temporal changing rate of the intake pipe pressure, to temperature behavior for a frequency component higher than the temperature sensor detection response performance. Accordingly, the value detected by the temperature sensor can be used as it is on the low frequency component where the temperature sensor is responsive to variation in actual intake pipe temperature, and the intake pipe temperature estimation value can be used on the high frequency component where the temperature sensor is not responsive thereto. This can improve robustness against the transient temperature behavior of the intake pipe, and appropriately prevent transient knocking in the case of computing the ignition timing during transient time of the internal combustion engine on the basis of the transient behavior of the intake pipe.

The internal combustion engine control device of the present invention further includes ignition timing computation means for computing an ignition timing during transient time of the internal combustion engine, on the basis of the transient behavior of the intake pipe estimated by the intake pipe temperature transient behavior computation means. Accordingly, the ignition timing during transient time of the internal combustion engine can be controlled on the basis of the estimated transient behavior of the intake pipe, and transient knocking can appropriately be prevented.

According to the internal combustion engine control device of the present invention, the ignition timing computation means computes a ignition timing reference, according to at least an ignition timing map having axes of a rotation speed and charging efficiency, and corrects the ignition timing reference, according to a polynomial that employs at least a rotation speed, a charging efficiency, and an intake pipe temperature as input parameters. Accordingly, transient knocking can appropriately be prevented.

According to the internal combustion engine control device of the present invention, in the case of an identical intake pipe temperature increase amount, the lower the rotation speed is and the higher the charging efficiency is, the further the ignition timing computation means corrects an ignition timing to a retard side. Accordingly, transient knock can appropriately be prevented.

The internal combustion engine control device of the present invention further includes: target air-fuel ratio computation means for computing a target air-fuel ratio on the basis of a rotation speed and a charging efficiency; filter means for applying a filter process to the estimated intake pipe temperature transient behavior at a prescribed filter width; transient temperature increase amount computation means for computing an amount of transient temperature increase by subtracting intake pipe temperature transient behavior after the filter process from the intake pipe temperature transient behavior; and transient knock rich correction means for correcting the air-fuel ratio to a richer side with increase in the amount of transient temperature increase computed by the transient temperature increase amount computation means. In contrast to reduction in output by retard correction of the ignition timing, the method of avoiding knocking by rich correction according to the present invention can suppress reduction of output while having a disadvantage of degradation in fuel consumption performance, thereby allowing a control system emphasizing acceleration performance to be realized.

According to the internal combustion engine control device of the present invention, the ignition timing computation means includes transient knock ignition timing correction means for performing transient knock correction on an ignition timing reference based on a rotation speed and a charging efficiency further to a retard side, with a larger net gas mass temporal changing rate in the intake pipe that is acquired by subtracting a flow rate of gas flowing out of the intake pipe from a flow rate of gas flowing into the intake pipe, and with a larger temporal changing rate of the intake pipe pressure, during transient time of the internal combustion engine. Accordingly, the transient knock can appropriately be prevented.

The internal combustion engine control device of the present invention further includes transient knock rich correction means for correcting air-fuel ratio reference to a richer side, with a larger net gas mass temporal changing rate in the intake pipe that is acquired by subtracting a flow rate of gas flowing out of the intake pipe from a flow rate of gas flowing into the intake pipe, and with a larger temporal changing rate of the intake pipe pressure, during transient time of the internal combustion engine. In contrast to reduction in output by retard correction of the ignition timing, the method of avoiding knocking by rich correction according to the present invention can suppress reduction of output while having a disadvantage of degradation in fuel consumption performance, thereby allowing a control system emphasizing acceleration performance to be realized.

The internal combustion engine control device of the present invention further includes transient temperature behavior computation means for estimating transient behavior of the intake pipe temperature, on the basis of a flow rate of gas flowing into the intake pipe, a flow rate of gas flowing from the intake pipe, an intake pipe pressure, and a temporal changing rate of the intake pipe pressure; and charging efficiency computation means for computing a charging efficiency on the basis of the estimated transient behavior of the intake pipe. This enables estimation accuracy of the charging efficiency during transient time to be improved. Accordingly, in the case of computing an amount of fuel injection on the basis of the charging efficiency and the target air-fuel ratio, the accuracy of air-fuel ratio control can be improved.

Note that the present invention is not limited to the aforementioned embodiments. Instead, the present invention can variously be changed in a range without deviating from the gist of the present invention.

The invention claimed is:

1. An internal combustion engine control device, comprising
    intake pipe temperature transient behavior computation means for estimating transient behavior of an intake pipe temperature on the basis of a flow rate of gas flowing into an intake pipe, a flow rate of gas flowing from the intake pipe, an intake pipe pressure, and a temporal changing rate of the intake pipe pressure.

2. The internal combustion engine control device according to claim 1,
    wherein, in a case where the internal combustion engine comprises a throttle valve that adjusts a flow rate of gas flowing in the intake pipe,
    the device comprises throttle valve passing flow rate computation means for computing a throttle valve passing flow rate of gas passing through the throttle valve on the basis of a valve opening of the throttle valve, a pressure upstream of the throttle valve, a pressure downstream of the throttle valve, and a temperature upstream of the throttle valve, and
    the intake pipe temperature transient behavior computation means sets the throttle valve passing flow rate computed by the throttle valve passing flow rate computation means, as a flow rate of gas flowing into the intake pipe.

3. The internal combustion engine control device according to claim 1,
    wherein, in a case where the internal combustion engine comprises a throttle valve that adjusts a flow rate of gas flowing upstream of the intake pipe,
    the device further comprises: intake pipe pressure temporal changing rate computation means for computing a temporal changing rate of the intake pipe pressure, on the basis of a flow rate of gas flowing into the intake pipe, a flow rate of gas flowing from the intake pipe, a temperature upstream of the throttle valve, and the intake pipe temperature; and
    intake pipe pressure computation means for computing the intake pipe pressure, on the basis of a temporal changing rate of the intake pipe pressure computed by the intake pipe pressure temporal changing rate computation means.

4. The internal combustion engine control device according to claim 1,
    wherein, in a case where the internal combustion engine comprises a turbocharger, an airflow sensor detecting a flow rate of gas flowing through a compressor of the turbocharger, and a throttle valve adjusting a flow rate of gas flowing downstream of the compressor,
    the intake pipe temperature transient behavior computation means sets a compressor passing flow rate of gas flowing through the compressor, as a throttle valve upstream gas inflow rate of gas flowing into downstream of the compressor and upstream of the throttle valve,
    sets a throttle valve passing flow rate of gas flowing through the throttle valve of the intake pipe, as a throttle valve upstream gas outflow rate of gas flowing out from downstream of the compressor and upstream of the throttle valve, and
    estimates transient behavior of throttle valve upstream intake pipe temperature at a site downstream of the compressor, on the basis of the throttle valve upstream gas inflow rate, the throttle valve upstream gas outflow rate, the throttle valve upstream intake pipe pressure, and a temporal changing rate of the throttle valve upstream intake pipe pressure.

5. The internal combustion engine control device according to claim 1, further comprising:
    means for detecting intake pipe temperature by a temperature sensor;
    means for setting a detection value detected by a temperature sensor to temperature behavior for a frequency component lower than the temperature sensor detection response performance; and
    means for setting an intake pipe temperature estimation value based on a flow rate of gas flowing into the intake pipe, a flow rate of gas flowing from the intake pipe, an intake pipe pressure, and a temporal changing rate of the intake pipe pressure, to temperature behavior for a frequency component higher than the temperature sensor detection response performance.

6. The internal combustion engine control device according to claim 1, further comprising:
    target air-fuel ratio computation means for computing a target air-fuel ratio on the basis of a rotation speed and a charging efficiency;
    filter means for applying a filter process to the estimated intake pipe temperature transient behavior at a prescribed filter width;
    transient temperature increase amount computation means for computing an amount of transient temperature increase by subtracting intake pipe temperature transient behavior after the filter process from the intake pipe temperature transient behavior; and transient knock rich correction means for correcting the air-fuel ratio to a richer side with increase in the amount of transient temperature increase computed by the transient temperature increase amount computation means.

7. The internal combustion engine control device according to claim 1, wherein the ignition timing computation means comprises transient knock ignition timing correction means for performing transient knock correction on an ignition timing reference based on a rotation speed and a charging efficiency further to a retard side, with a larger net gas mass temporal changing rate in the intake pipe that is acquired by subtracting a flow rate of gas flowing out of the intake pipe from a flow rate of gas flowing into the intake pipe, and with a larger temporal changing rate of the intake pipe pressure, during transient time of the internal combustion engine.

8. The internal combustion engine control device according to claim 1, further comprising transient knock rich correction means for correcting air-fuel ratio reference to a richer side, with a larger net gas mass temporal changing rate in the intake pipe that is acquired by subtracting a flow rate of gas flowing out of the intake pipe from a flow rate of gas flowing into the intake pipe, and with a larger temporal changing rate of the intake pipe pressure, during transient time of the internal combustion engine.

9. The internal combustion engine control device according to claim 1, further comprising:

transient temperature behavior computation means for estimating transient behavior of the intake pipe temperature, on the basis of a flow rate of gas flowing into the intake pipe, a flow rate of gas flowing from the intake pipe, an intake pipe pressure, and a temporal changing rate of the intake pipe pressure; and charging efficiency computation means for computing a charging efficiency on the basis of the estimated transient behavior of the intake pipe.

10. The internal combustion engine control device according to claim 1, wherein, in a case where the internal combustion engine comprises a throttle valve that adjusts a flow rate of gas flowing upstream of the intake pipe, the intake pipe temperature transient behavior computation means sets a throttle valve passing flow rate of gas passing through the throttle valve, as a flow rate of gas flowing into the intake pipe.

11. The internal combustion engine control device according to claim 10, wherein, in a case where the internal combustion engine further comprises an airflow sensor that detects a flow rate of gas flowing upstream of the intake pipe, the intake pipe temperature transient behavior computation means regards an airflow part gas flow rate detected by the airflow sensor as the throttle valve passing flow rate, and sets the flow rate as a flow rate of gas flowing into the intake pipe.

12. The internal combustion engine control device according to claim 1, wherein, in a case where the internal combustion engine comprises a variable valve mechanism capable of changing a valve opening and closing timing or an amount of lift on the basis of a preset working amount, the device further comprises cylinder flow rate computation means for computing a cylinder flow rate of gas flowing into a cylinder of the internal combustion engine, on the basis of a polynomial that employs at least a rotation speed of the internal combustion engine, the intake pipe pressure, a working amount of the variable valve, and the intake pipe temperature as input parameters, and the intake pipe temperature transient behavior computation means sets the cylinder flow rate of gas computed by the cylinder flow rate computation means, as a flow rate of gas flowing from the intake pipe.

13. The internal combustion engine control device according to claim 12, wherein the cylinder flow rate computation means comprises:

charging efficiency computation means for computing a charging efficiency on the basis of the rotation speed, the intake pipe pressure, and a working amount of the variable valve; and mass flow rate conversion means for conversion into the cylinder flow rate based on the charging efficiency computed by the charging efficiency computation means and the rotation speed.

14. The internal combustion engine control device according to claim 1, further comprising ignition timing computation means for computing an ignition timing during transient time of the internal combustion engine, on the basis of the transient behavior of the intake pipe estimated by the intake pipe temperature transient behavior computation means.

15. The internal combustion engine control device according to claim 14, wherein the ignition timing computation means computes a ignition timing reference, according to at least an ignition timing map having axes of a rotation speed and charging efficiency, and corrects the ignition timing reference, according to a polynomial that employs at least a rotation speed, a charging efficiency, and an intake pipe temperature as input parameters.

16. The internal combustion engine control device according to claim 15, wherein, in the case of an identical intake pipe temperature increase amount, the lower the rotation speed is and the higher the charging efficiency is, the further the ignition timing computation means corrects an ignition timing to a retard side.

17. An internal combustion engine control device, wherein, in a case where an internal combustion engine comprises a throttle valve that adjusts a flow rate of gas flowing upstream of the intake pipe, the device comprises:

intake pipe temperature transient behavior computations means for estimating transient behavior of an intake pipe temperature on the basis of a flow rate of gas flowing into an intake pipe, a flow rate of gas flowing from the intake pipe, an intake pipe pressure, and a temporal changing rate of the intake pipe pressure;

intake pipe pressure temporal changing rate computation means for computing a temporal changing rate of the intake pipe pressure, on the basis of a flow rate of gas flowing into the intake pipe, a flow rate of gas flowing from the intake pipe, a temperature upstream of the throttle valve, and the intake pipe temperature; and intake pipe pressure computation means for computing the intake pipe pressure, on the basis of a temporal changing rate of the intake pipe pressure computed by the intake pipe pressure temporal changing rate computation means.

18. An internal combustion engine control device, wherein, in a case where the internal combustion engine comprises a turbocharger, an airflow sensor detecting a flow rate of gas flowing through a compressor of the turbocharger, and a throttle valve adjusting a flow rate of gas flowing downstream of the compressor, the device comprises:
   intake pipe temperature transient behavior computation means for estimating transient behavior of an intake pipe temperature on the basis of a flow rate of gas flowing into an intake pipe, a flow rate of gas flowing from the intake pipe, an intake pipe pressure, and a temporal changing rate of the intake pipe pressure, and wherein
   the intake pipe temperature transient behavior computation means sets a compressor passing flow rate of gas flowing through the compressor, as a throttle valve upstream gas inflow rate of gas flowing into upstream of the throttle valve located downstream of the compressor,
   sets a throttle valve passing flow rate of gas flowing through the throttle valve of the intake pipe, as a throttle valve upstream gas outflow rate of gas flowing out from upstream of the throttle valve located downstream of the compressor, and
   estimates transient behavior of throttle valve upstream intake pipe temperature at a site downstream of the compressor, on the basis of the throttle valve upstream gas inflow rate, the throttle valve upstream gas outflow rate, the throttle valve upstream intake pipe pressure, and a temporal changing rate of the throttle valve upstream intake pipe pressure.

19. An internal combustion engine control device, wherein in a case where an internal combustion engine comprises a variable valve mechanism capable of changing a valve opening and closing timing or an amount of lift on the basis of a preset working amount, the device comprises:
   intake pipe temperature transient behavior computation means for estimating transient behavior of an intake pipe temperature on the basis of a flow rate of gas flowing into an intake pipe, a flow rate of gas flowing from the intake pipe, an intake pipe pressure, and a temporal changing rate of the intake pipe pressure; and
   cylinder flow rate computation means for computing a cylinder flow rate of gas flowing into a cylinder of the internal combustion engine, on the basis of a polynomial that employs at least a rotation speed of the internal combustion engine, the intake pipe pressure, a working amount of the variable valve, and the intake pipe temperature as input parameters, and wherein
   the intake pipe temperature transient behavior computation means sets the cylinder flow rate of gas computed by the cylinder flow rate computation means, as a flow rate of gas flowing from the intake pipe.

20. The internal combustion engine control device according to claim 19,
   wherein the cylinder flow rate computation means comprises:
   charging efficiency computation means for computing a charging efficiency on the basis of the rotation speed, the intake pipe pressure, and a working amount of the variable valve; and
   mass flow rate conversion means for conversion into the cylinder flow rate based on the charging efficiency computed by the charging efficiency computation means and the rotation speed.

21. An internal combustion engine control device, wherein, in a case where the internal combustion engine comprises a throttle valve that adjusts a flow rate of gas flowing in the intake pipe, the device comprises:
   intake pipe temperature transient behavior computation means for estimating transient behavior of an intake pipe temperature on the basis of a flow rate of gas flowing into the intake pipe, a flow rate of gas flowing from the intake pipe, an intake pipe pressure, and a temporal changing rate of the intake pipe pressure; and
   throttle valve passing flow rate computation means for computing a throttle valve passing flow rate of gas passing through the throttle valve on the basis of a valve opening of the throttle valve, a pressure upstream of the throttle valve, a pressure downstream of the throttle valve, and a temperature upstream of the throttle valve, and wherein
   the intake pipe temperature transient behavior computation means sets the throttle valve passing flow rate of gas computed by the throttle valve passing flow rate computation means, as a flow rate of gas flowing into the intake pipe.

22. The internal combustion engine control device according to claim 21, further comprising:
   means for detecting intake pipe temperature by a temperature sensor;
   means for setting a detection value detected by a temperature sensor to temperature behavior for a frequency component lower than detection response performance of the temperature sensor; and
   means for setting an intake pipe temperature estimation value based on a flow rate of gas flowing into the intake pipe, a flow rate of gas flowing from the intake pipe, an intake pipe pressure, and a temporal changing rate of the intake pipe pressure, to temperature behavior for a frequency component higher than detection response performance of the temperature sensor.

23. The internal combustion engine control device according to claim 11, further comprising:
   target air-fuel ratio computation means for computing a target air-fuel ratio on the basis of a rotation speed and a charging efficiency;
   filter means for applying a filter process to the estimated intake pipe temperature transient behavior at a prescribed filter width;
   transient temperature increase amount computation means for computing an amount of transient temperature increase by subtracting intake pipe temperature transient behavior after the filter process from the intake pipe temperature transient behavior; and
   transient knock rich correction means for correcting the air-fuel ratio to a richer side with increase in the amount of transient temperature increase computed by the transient temperature increase amount computation means.

24. The internal combustion engine control device according to claim 21, further comprising
   transient knock rich correction means for correcting air-fuel ratio reference based on a rotation speed and a charging efficiency further to a richer side, with a larger net gas mass temporal changing rate in the intake pipe that is acquired by subtracting a flow rate of gas flowing out of the intake pipe from a flow rate of gas flowing into the intake pipe, and with a larger temporal changing rate of the intake pipe pressure, during transient time of the internal combustion engine.

25. The internal combustion engine control device according to claim 21, further comprising:
   charging efficiency computation means for computing a charging efficiency on the basis of the transient behavior of the intake pipe temperature estimated by the intake pipe temperature transient behavior computation means.

26. The internal combustion engine control device according to claim 21, further comprising
> ignition timing computation means for computing an ignition timing during transient time of the internal combustion engine, on the basis of the transient behavior of the intake pipe temperature estimated by the intake pipe temperature transient behavior computation means.

27. The internal combustion engine control device according to claim 26,
> wherein the ignition timing computation means comprises transient knock ignition timing correction means for performing transient knock correction on an ignition timing reference based on a rotation speed and a charging efficiency further to a retard side, with a larger net gas mass temporal changing rate in the intake pipe that is acquired by subtracting a flow rate of gas flowing out of the intake pipe from a flow rate of gas flowing into the intake pipe, and with a larger temporal changing rate of the intake pipe pressure, during transient time of the internal combustion engine.

28. The internal combustion engine control device according to claim 26,
> wherein the ignition timing computation means computes an ignition timing reference, according to at least an ignition timing map having axes of a rotation speed and charging efficiency, and
>
> corrects the ignition timing reference, according to a polynomial that employs at least a rotation speed, a charging efficiency, and an intake pipe temperature as input parameters.

29. The internal combustion engine control device according to claim 28,
> wherein, in the case of an identical intake pipe temperature increase amount, the lower the rotation speed is and the higher the charging efficiency is, the further the ignition timing computation means corrects an ignition timing to a retard side.

* * * * *

UNITED STATES PATENT AND TRADEMARK OFFICE
CERTIFICATE OF CORRECTION

PATENT NO. : 8,473,182 B2
APPLICATION NO. : 13/511384
DATED : June 25, 2013
INVENTOR(S) : Kunihiko Suzuki et al.

It is certified that error appears in the above-identified patent and that said Letters Patent is hereby corrected as shown below:

In the Claims:

In claim 23, column 26, lines 34 and 35 should read:

--23. The internal combustion engine control device according to claim 21, further comprising:--

Signed and Sealed this
Tenth Day of September, 2013

Teresa Stanek Rea
*Acting Director of the United States Patent and Trademark Office*